US012356959B2

(12) United States Patent
Tierney et al.

(10) Patent No.: US 12,356,959 B2
(45) Date of Patent: Jul. 15, 2025

(54) ANIMAL CAGING SYSTEM FOR REMOTE MONITORING

(71) Applicant: ANIMAL CARE SYSTEMS, INC., Centennial, CO (US)

(72) Inventors: Robert Tierney, Centennial, CO (US); Andrew Poulter, Littleton, CO (US); Eric Corell, Morrison, CO (US); David Russell Heldt, Littleton, CO (US); Bryan Reagan, Madison, WI (US)

(73) Assignee: ANIMAL CARE SYSTEMS, INC., Centennial, CO (US)

( * ) Notice: Subject to any disclaimer, the term of this patent is extended or adjusted under 35 U.S.C. 154(b) by 74 days.

(21) Appl. No.: 17/885,264

(22) Filed: Aug. 10, 2022

(65) Prior Publication Data
US 2023/0046736 A1 Feb. 16, 2023

Related U.S. Application Data

(60) Provisional application No. 63/231,540, filed on Aug. 10, 2021.

(51) Int. Cl.
*A01K 1/03* (2006.01)

(52) U.S. Cl.
CPC .................... *A01K 1/031* (2013.01)

(58) Field of Classification Search
CPC .............................. A01K 1/031; A01K 29/005
USPC ......................................................... 119/419
See application file for complete search history.

(56) References Cited

U.S. PATENT DOCUMENTS

| 4,448,150 | A  | * | 5/1984  | Catsimpoolas | ........ | A01K 1/031 |
|           |    |   |         |              |          | 250/221    |
| 4,682,437 | A  | * | 7/1987  | Akerberg     | ...........| A01K 91/02 |
|           |    |   |         |              |          | 43/19      |
| 6,279,511 | B1 | * | 8/2001  | Loughnane    | ..........| A01K 29/005|
|           |    |   |         |              |          | 119/421    |
| 6,475,776 | B1 | * | 11/2002 | Higuchi      | .................| C12M 27/10 |
|           |    |   |         |              |          | 422/561    |
| 8,152,389 | B1 | * | 4/2012  | Lammens      | ............| G03B 17/561|
|           |    |   |         |              |          | 396/419    |
| 10,159,221| B1 | * | 12/2018 | Estes        | .....................| A01K 15/027|
| 10,729,098| B2 | * | 8/2020  | Conger       | ...................| A01K 1/031 |
| 10,959,398| B1 | * | 3/2021  | Betts-Lacroix| ....... | G06V 10/143|

(Continued)

FOREIGN PATENT DOCUMENTS

| DE | 102014103134 A1 | * | 9/2015 | ............ A01J 5/0175 |
| SG | 11202101583    | * | 3/2021 |                          |

(Continued)

*Primary Examiner* — Kimberly S Berona
*Assistant Examiner* — Erica Michelle Huebner
(74) *Attorney, Agent, or Firm* — Lando & Anastasi, LLP

(57) ABSTRACT

An animal caging system for remote monitoring includes a frame, a carousel-style rack configured to support at least one animal cage, and a monitoring system attached to the frame for capturing data from the animal cage. The monitoring system includes a support leg, a mounting arm for mounting the monitoring system to the frame, and at least one sensor for monitoring or observing the interior of the cage. The monitoring system may also include a motor for rotating the carousel-style rack, to allow multiple cages to be monitored by a single sensor or set of sensors, in sequence, as the carousel-style rack rotates.

37 Claims, 21 Drawing Sheets

(56) References Cited

U.S. PATENT DOCUMENTS

| | | | | |
|---|---|---|---|---|
| 2004/0217858 A1* | 11/2004 | Ingley, III | ............... | A01K 1/031 340/573.1 |
| 2005/0076839 A1* | 4/2005 | Van Den Berg | .......... | A01J 7/04 119/14.04 |
| 2007/0079765 A1* | 4/2007 | Carter | .................... | A01K 1/031 119/456 |
| 2009/0002496 A1* | 1/2009 | Esmaeili | .............. | A01K 29/005 348/207.1 |
| 2011/0308468 A1* | 12/2011 | Esch | ....................... | A01K 1/126 119/14.08 |
| 2012/0200674 A1* | 8/2012 | Hofman | ................. | A01K 1/126 382/110 |
| 2012/0241464 A1* | 9/2012 | Adams | ..................... | G07F 11/54 221/277 |
| 2014/0020635 A1* | 1/2014 | Sayers | ................. | A01K 15/021 348/143 |
| 2017/0075199 A1* | 3/2017 | Buttimer | ................. | F16M 13/00 |
| 2017/0339910 A1* | 11/2017 | Heldt | ..................... | A01K 29/00 |
| 2019/0299204 A1* | 10/2019 | Hammelbacher | ....... | B01L 3/508 |
| 2021/0087029 A1* | 3/2021 | Fenton | ................... | B66F 7/0641 |
| 2021/0224979 A1* | 7/2021 | Hunter | ....................... | G06T 7/64 |
| 2021/0239911 A1* | 8/2021 | Song | ................... | A61B 5/0084 |
| 2022/0151162 A1* | 5/2022 | Allgeier | .................... | A01G 9/14 |
| 2022/0174898 A1* | 6/2022 | Allgeier | ................. | A01G 31/06 |

FOREIGN PATENT DOCUMENTS

| | | | | |
|---|---|---|---|---|
| WO | WO-2013130000 A1 * | 9/2013 | ................ | A01J 7/04 |
| WO | WO-2021066719 A1 * | 4/2021 | .............. | A01J 5/007 |

* cited by examiner

Engaged

Disengaged

ANIMAL CAGING SYSTEM FOR REMOTE MONITORING

CROSS-REFERENCE TO RELATED APPLICATIONS

This application claims priority under 35 U.S.C. § 119(e) to U.S. Provisional Application Ser. No. 63/231,540, titled "ANIMAL CAGING SYSTEM FOR REMOTE MONITORING," filed on Aug. 10, 2021, which is incorporated herein by reference in its entirety for all purposes.

FIELD OF TECHNOLOGY

The disclosure relates generally to the field of animal caging systems, and more specifically to caging systems utilizing automated, remote monitoring.

SUMMARY

In accordance with one aspect, there is provided a monitoring system for use with an animal caging system. The monitoring system may comprise a support leg. The monitoring system may comprise a mounting arm configured to attach the support leg to the animal caging system. The monitoring system may comprise a first sensor attached to the support leg. In some embodiments the support leg is configured to be mounted to the animal caging system in a monitoring position, in which the first sensor is in a position to monitor the animal caging system.

In some embodiments, the first sensor is an optical sensor.

In some embodiments, the first sensor is a non-optical sensor.

In some embodiments, the support leg comprises a first sensor arm, and the first sensor is attached to the first sensor arm.

In some embodiments, the monitoring system further comprises a second sensor arm attached to the support leg, and a second sensor attached to the second sensor arm.

In some embodiments, the first sensor is a camera configured to capture images in one or both of an infrared or visible spectrum of light.

In some embodiments, the monitoring system further comprises a second sensor attached to the support leg.

In some embodiments, the monitoring system further comprises a motor attached to the support leg, wherein the motor is configured to rotate a portion of the animal caging system.

In some embodiments, the first sensor is connectable to a control unit operating a software interface configured to receive data captured by the first sensor.

In some embodiments, the software interface is programmed to interpret the data captured by the first sensor to generate identifying information.

In some embodiments, the software interface is programmed to interpret the data captured by the first sensor to generate status information indicative of one or more of: an animal vital sign, an animal birth event, an animal death, an animal experiencing an elevated immune response, a low level of animal food, a low level of animal water, an animal cage flooding, or an animal cage dirty bedding.

In accordance with another aspect, there is provided an animal caging system. The animal caging system may comprise a frame, a cage rack supported by the frame, an animal cage supported by the cage rack, and a monitoring system having a support leg, a mounting arm attached to the support leg and to the frame, and a sensor configured to be mounted on the support leg.

In some embodiments, the support leg comprises a sensor arm, and the sensor is configured to be mounted on the sensor arm.

In some embodiments, the monitoring system is capable of being mounted to the animal caging system in a monitoring position in which the sensor is positioned relative to the animal cage.

In some embodiments, the monitoring system is capable of being rotated into the monitoring position in which the sensor is positioned in front or above the animal cage.

In some embodiments, the animal caging system further comprises a motor configured to rotate the cage rack.

In some embodiments, the motor is configured to disengage from the cage rack when the cage rack has stopped rotating.

In some embodiments, the sensor is a camera configured to capture an image of an interior of the animal cage when the cage rack has stopped rotating.

In some embodiments, the sensor is configured to capture data encoding identifying information associated with the animal or animal cage.

In some embodiments, the sensor is a camera configured to capture an image of an interior of the animal cage once every rotation of the cage rack.

In some embodiments, the animal caging system further comprises a plurality of cage racks supported by the frame and a plurality of animal cages on each cage rack. The monitoring system may include a plurality of sensors mounted on the support leg. At least one sensor may be configured to capture an image of each of the plurality of animal cages on the cage rack once every rotation of the cage rack.

In some embodiments, the monitoring system includes a plurality of sensor arms attached to the support leg and at least one sensor mounted on each sensor arm.

In some embodiments, more than one sensor is configured to capture the image of each of the plurality of animal cages on the cage rack.

In some embodiments, the camera is configured to capture a video stream of the cage rack while static and when the cage rack is rotating.

In some embodiments, the monitoring system is connectable to a software interface configured to receive images captured by the camera.

In some embodiments, the software interface is programmed to generate identifying information or status information from the images.

In accordance with another aspect, there is provided a method of monitoring animal cages in an animal caging system including a cage rack, an animal cage configured to be housed on the cage rack, a motor configured to rotate the cage rack, and a sensor. The method may comprise rotating the cage rack via the motor to position the animal cage relative to the sensor The method may comprise capturing data from the animal cage via the sensor to be transmitted to a software interface programmed to interpret the data captured by the sensor.

In some embodiments, the sensor is a camera and the data includes images captured by the camera. The method may further comprise detecting via a control program that the camera is positioned above or in front of the animal cage. The method may comprise storing via the software interface the images captured by the camera.

In some embodiments, the images captured by the camera include a series of two-dimensional images. The method may further comprising creating via the software interface a three-dimensional image of the animal cage based on the series of two-dimensional images captured by the camera.

In accordance with another aspect, there is provided a method of retrofitting an animal caging system comprising a frame, a cage rack supported by the frame, and an animal cage supported by the cage rack. The method may comprise providing a monitoring system having a support leg, a mounting arm attachable to the support leg and to the frame, and a sensor configured to be mounted on the support leg. The method may comprise providing instructions to attach the support leg to the frame via the mounting arm.

In some embodiments, the method may further comprise providing a motor configured to rotate the cage rack and providing instructions to operably connect the motor to the cage rack.

In some embodiments, the method may further comprise providing a control interface and operably connecting the control interface to the motor. The control interface may be configured to disengage the motor from the cage rack when the cage rack has stopped rotating.

In some embodiments, the method may further comprise providing access to a software interface connectable to the sensor and configured to receive data captured by the sensor.

In some embodiments, the software interface is programmed to interpret the data captured by the sensor.

DETAILED DESCRIPTION

Figure 1:
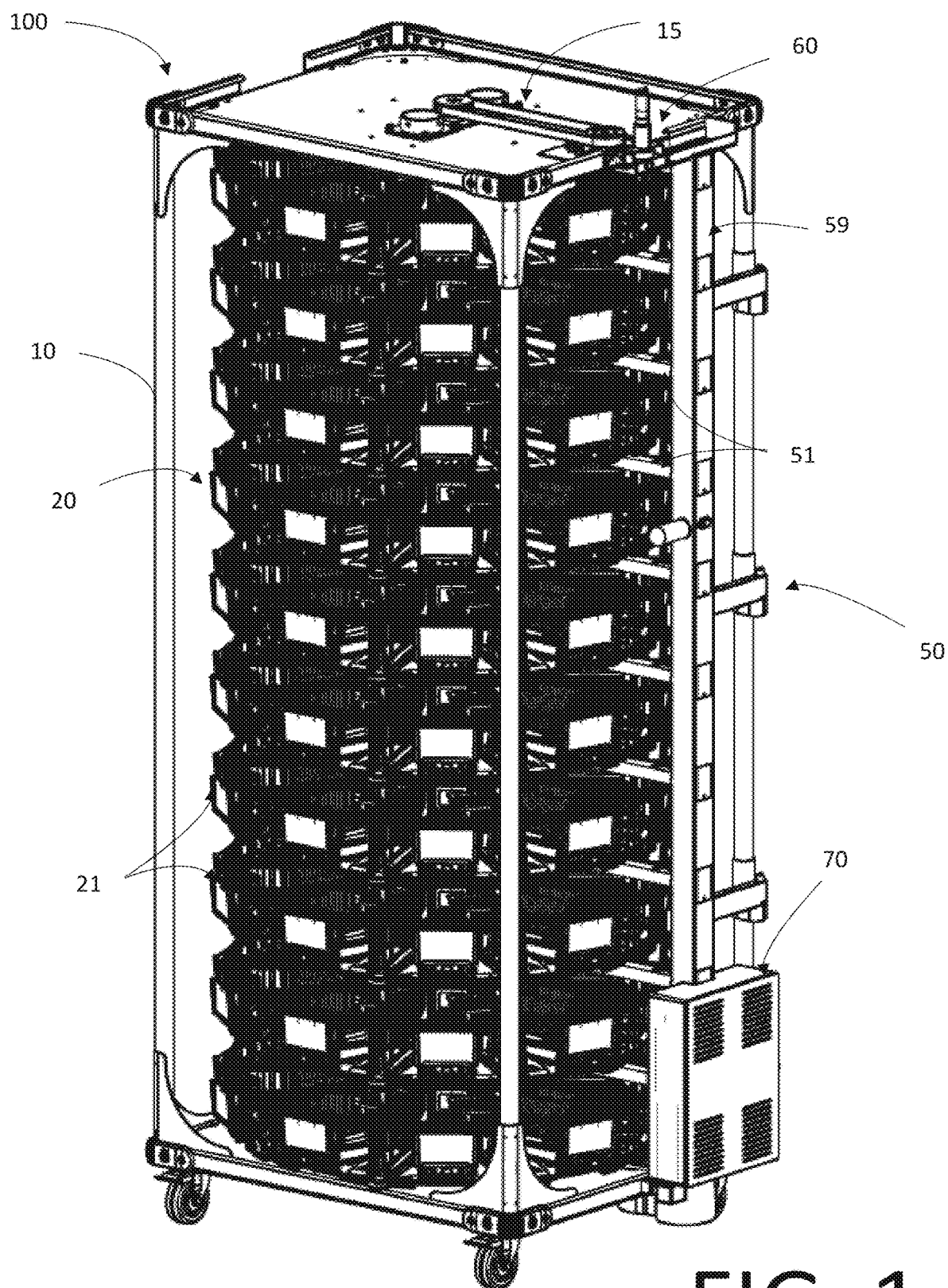
FIG. 1 is a front perspective view of an animal caging system.

Modern laboratory research often requires the use of a large number of laboratory animals, including rats and mice. Caging systems exist to house such animals in a relatively small amount of space. However, caring for and monitoring these animals remains a labor-intensive process.

Laboratory mice may be checked once to twice a day for wellness, adequate food and water, and cage cleanliness. Some animals may require more frequent monitoring due to illness, research needs, birthing, and other conditions. These animals may not receive the required monitoring and early veterinary intervention due to lack of personnel and time, and the inconvenience of entering facilities, especially barrier facilities or ones at remote locations from laboratories.

Animal monitoring may also be restricted to the daytime. Animal facilities may also restrict research personnel in the facility after normal working hours. This may be a particular drawback for laboratories engaged in behavioral research because the nighttime is when mice are most active, and when meaningful behaviors are expressed.

Conventional monitoring systems suffer from the drawback of being high-cost, and either do not monitor every cage or require a designated sensor or camera for every single cage being monitored.

A need exists for a system that allows multiple animal cages to be monitored with a single sensor or camera. Such a system may be capable of remote monitoring, and may, in certain embodiments, be equipped with infrared cameras so that animals can be conveniently observed at any time, day or night, without disturbing the animals or disrupting their normal circadian rhythm. This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Aspects of the present disclosure are directed to a system for remote monitoring of animal cages. The animal caging system may utilize a carousel-style rack, with one or more sensors that can brought into position to monitor one or more cages. The sensors may generally be non-contact sensors. In certain exemplary embodiments, the sensors may be optical sensors, such as cameras. The cameras may be capable of monitoring cages when lighted or in darkness. For example, the cameras may be equipped with infrared capability, to allow nighttime surveillance of the animals without disturbing their activity or disrupting their circadian rhythms with unnecessary camera light. In other embodiments, the sensors may be non-optical sensors. Exemplary non-optical sensors include, for example, temperature or heat sensors, or atmospheric sensors for detecting atmospheric gas levels, such as carbon dioxide, carbon monoxide, ammonia, oxygen, hydrogen sulfide, methane, nitric oxide, other gases, or humidity. In some embodiments, the system may include a second sensor. Such a system may be capable of remote and/or automatic calibration of each sensor.

The sensors may be mounted on a support leg that can be attached to the animal caging system in a monitoring position that allows for monitoring of the cages. In some embodiments, the support leg may be rotated into multiple positions. One position may be the monitoring position. Another position may be out of the way of the cages to allow researchers unobstructed access to the cages. The support leg itself may be removable from the carousel-style rack for separate maintenance or cleaning of the carousel-style rack or of the monitoring system. In certain embodiments, the support leg may include one or more arms. Each arm may be attachable to one or more sensors. The arms may allow additional positions for monitoring of the cages. For example, one arm may be maintained in a monitoring position while another arm may be positioned out of the way to allow access to the animal cage.

Referring to FIG. 1, an animal caging system 100 may include an exterior frame 10 that surrounds and supports a carousel-style rack 20. Carousel-style rack 20 may comprise one or more platters 21. And each platter 21 may be configured for the mounting of a plurality of cages 22. Cages 22 may be wedge-shaped to maximize the available interior space of each cage, while allowing multiple cages to be placed in a circular configuration on each platter 21. According to one embodiment, carousel-style rack 20 may support five, six, seven, eight, nine, ten, eleven, twelve, or more platters 21, with each platter 21 holding five, six, seven, eight, nine, ten, eleven, twelve or more cages 22. However, animal caging system 100 may be configured to support as few as one platter 21, or as many platters 21 as may be desirable. Similarly, each platter 21 may hold one or more cages 22.

Animal caging system 100 also may include a support leg 50 that may be removably mounted to the exterior frame 10. Support leg 50 may be constructed of any material known in the art to be useful for structural supports, including stainless steel and aluminum. In one embodiment, support leg 50 is constructed of brushed stainless steel. In another embodiment, support leg 50 is painted with a heat-resistant powder coat enamel. In some embodiments, the materials and paints used in support leg 50 are known to be safe for autoclaving, so that support leg 50 may be conveniently cleaned and sterilized. However, other materials may be used in embodiments for applications where sterilization is not required.

Figure 5:
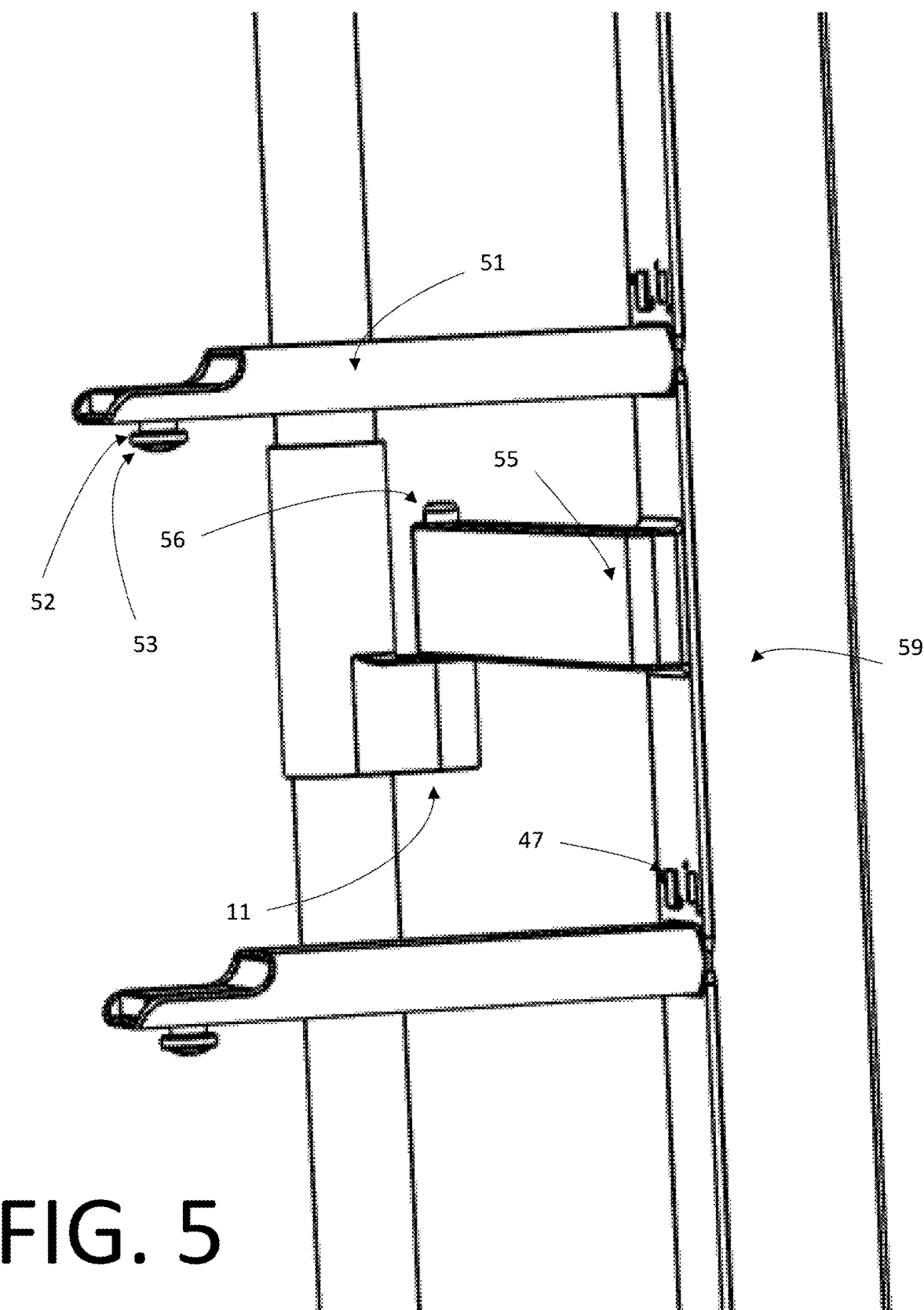
FIG. 5 is a front perspective view of an arm.

Referring to FIG. 5, support leg 50 may be attached to one or more mounting arms 55, for removably mounting support leg 50 to exterior frame 10. Mounting arm 55 may be configured to removably attach support leg 50 to exterior frame 10 through any structure known in the art, including via pole pins 56 inserted through a vertical shaft through mounting arm 55, into a corresponding pole pin receptacle 11 located on exterior frame 10. The use of pole pins or a similar removable attachment may be advantageous because it allows support leg 50 to be entirely removed from animal caging system 100 to facilitate cleaning or maintenance, without the need for specialized tools or connectors. The use of pole pins is also advantageous because it allows support leg 50 to rotate about its connection to exterior frame 10. This allows support leg 50 to be rotated away from the cages, either to access carousel-style rack 20 or the components housed within support leg 50 for maintenance or cleaning, and then be rotated back into position to monitor cages 22 without the need for further assembly or disassembly. Other mechanisms for mounting support leg 50 animal caging system 100 may be used, including hinges or brackets, snap connectors, slot connectors, or similar structures.

Figure 17:
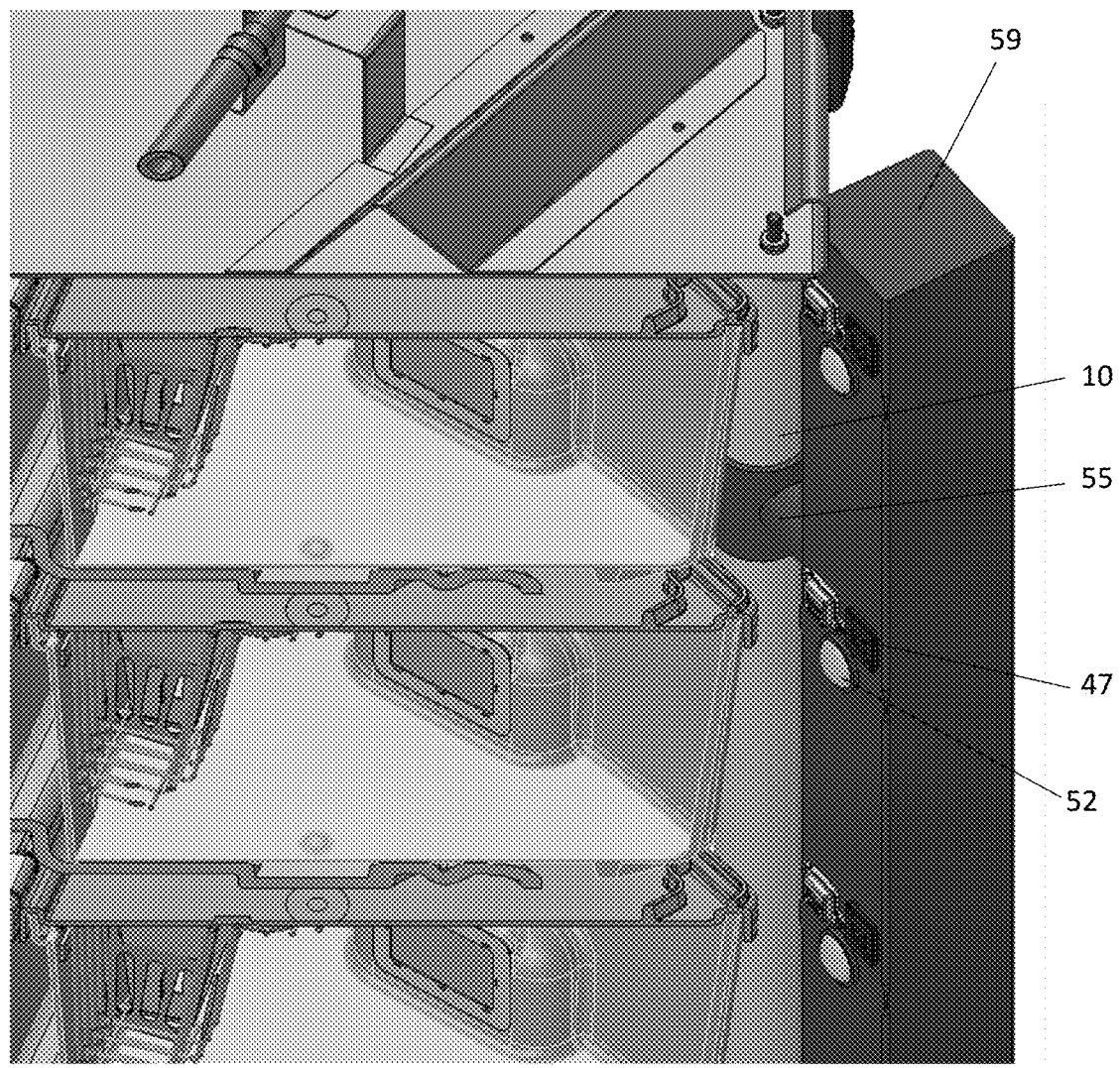
FIG. 17 is a partial perspective view of a support arm.

Support leg 5 may hold one or more sensors, such as cameras 52, located in a position suitable to monitor a portion or all of cage 22. The sensors may be mounted directly on a body 59 of support leg 50, as shown in FIG. 17.

In other embodiments, support leg 50 may be configured to support one or more arms 51, as shown in FIG. 5. In one embodiment, arm 51 is provided for each platter 21. For example, body 59 of support leg 50 may support 10 arms 51, corresponding to one arm 51 for each platter 21 of carousel-style rack 20. However, the system may be configured to support as many arms 51 as may be desirable. In some embodiments, where only a portion of cages 22 require remote monitoring, the number of arms 51 may be fewer than the number of platters 21. In other embodiments, where animals require more constant monitoring, the number of arms 51 may be greater than the number of platters 21 to allow more cages to be monitored simultaneously.

Each arm 51 may hold one or more sensors, such as cameras 52, located in a position suitable to monitor a portion or all of cage 22. Camera 52 may comprise a camera configured to receive visible light, such as a conventional digital camera. Camera 52 may also comprise devices capable of receiving and interpreting signals outside of the visible light spectrum, including infrared cameras. Arm 51 may also include multiple cameras 52. For example, one camera 52 could be for visible light, while a second camera 52 may detect infrared light. A plurality of cameras 52 may be used to collect a plurality of two-dimensional images. The two-dimensional images may be used to produce a three-dimensional image. Alternatively, a lens system using confocal imaging could provide 3-D imaging in cage 22. Camera 52 may be mounted on arm 51 in a location suitable to view the interior of cage 22. Alternatively, arm 51 may support sensor equipment, such as fiber optic cable or mirrors, to direct light signals to camera 52, which may be located on arm 51 or located remotely, such as on support leg 50. It should be understood that "images" as disclosed herein may include static images or dynamic images, such as video.

Arm 51 may support one or more light sources 53, configured to illuminate the interior of cage 22 to improve the quality of the image received by camera 52. Where camera 52 is a visible light camera, light source 53 may comprise a visible light, such as a white light or LED having a wavelength between 400-750 nm. Where camera 52 comprises an infrared camera, light source 53 may comprise a source of infrared light, such as a light or LED having wavelengths of between 750-1000 nm. In some embodiments, a light source in the infrared frequency spectrum may be advantageous for monitoring animals at night or in night-like conditions, as the light source 53 may be selected to emit infrared light at a frequency outside of an animal's perception, and may not interfere with their behavior or circadian rhythms. As with camera 52, the one or more light source 53 may be configured to shine light directly into cage 22, such as through an LED facing directly into the cage. In some embodiments, light source 53 may be housed in support leg 50 and the light from light source 53 may be directed into the cage through lenses, mirrors, fiber optic cable or similar means of directing light.

Camera 52 may be a digital camera capable of taking still photographs. Alternatively, Camera 52 may be capable of capturing live video. In some embodiments, camera 52 may be configured for hyperspectral imaging, either by selecting a camera capable of hyperspectral imaging, or by using multiple camera 52 each capable of imaging a different part of the optical spectrum. A wide variety of camera capabilities may be considered based on the monitoring needs of an operator without departing from the spirit of this disclosure.

Each arm 51 may support multiple sensors 52 in a variety of configurations. In one embodiment, arm 51 supports two sensors configured to monitor a cage 22 from different perspectives. For example, a first camera 52 may be oriented above cage 22 and configured to take images 81 from a top-down perspective. A second camera 52 may be oriented in front of the cage, and configured to take images 81 from a front-facing perspective. Either camera 52 in this configuration may be configured to read information associated with cage 22 that is in the camera's field of view. For example, the second camera 52 may be configured to obtain images containing text, a barcode, a QR code, or other methods of encoding data from an animal tag or cage label that may be stored with the images 81 of the cages 22, or may be processed by a computer processor or software, such as control interface 70 or software interface 80.

In other embodiments, the first sensor 52 may be an optical sensor, the second sensor 52 may be an alternate type of optical sensor or a non-optical sensor. In some embodiments, the first sensor 52 may be a non-optical sensor, the second sensor 52 may be an alternate type of non-optical sensor or an optical sensor. More than two sensors may be included, for example, three, four, five, six, seven, eight, nine, ten, or more types of sensors. Thus, in some embodiments, the monitoring system may be configured to collect a variety of data from animals in cages 22. Each sensor may be operably connected to a control interface 70 and/or software interface 80.

Each arm 51 may also support sensors in a variety of configurations. In one embodiment, arm 51 includes an NFC sensor 54. In this configuration, cage 22 may include an NFC tag in place of or addition to a cage label, said NFC tag having information associated with cage 22. Control interface 70 or software interface 80 may be capable of processing the signals received by NFC sensor 54, and associating information in the signal with the images 81 of the cages 22.

Support leg 50, for example, body 59 of support leg 50, may also include one or more data and/or electrical sockets 47, such as a USB port, an Ethernet port, or other data and electrical socket, as known in the art. One or more sockets 47 may be located on body 59 adjacent or in a general vicinity of each arm 51, configured to communicate data and electrical signals between control interface 70 and sensors 52 or light sources 53. By placing sockets adjacent to the arms 51, sensors 52 and light sources 53 can be removed from support leg 50 for maintenance or cleaning without requiring invasive disassembly. In other embodiments, such as when support leg 50 does not include arm 51, as shown in FIG. 17, data and/or electrical sockets 47 may be positioned on body 59 adjacent or in a general vicinity of sensor 52 and/or light source 53.

Figure 6:
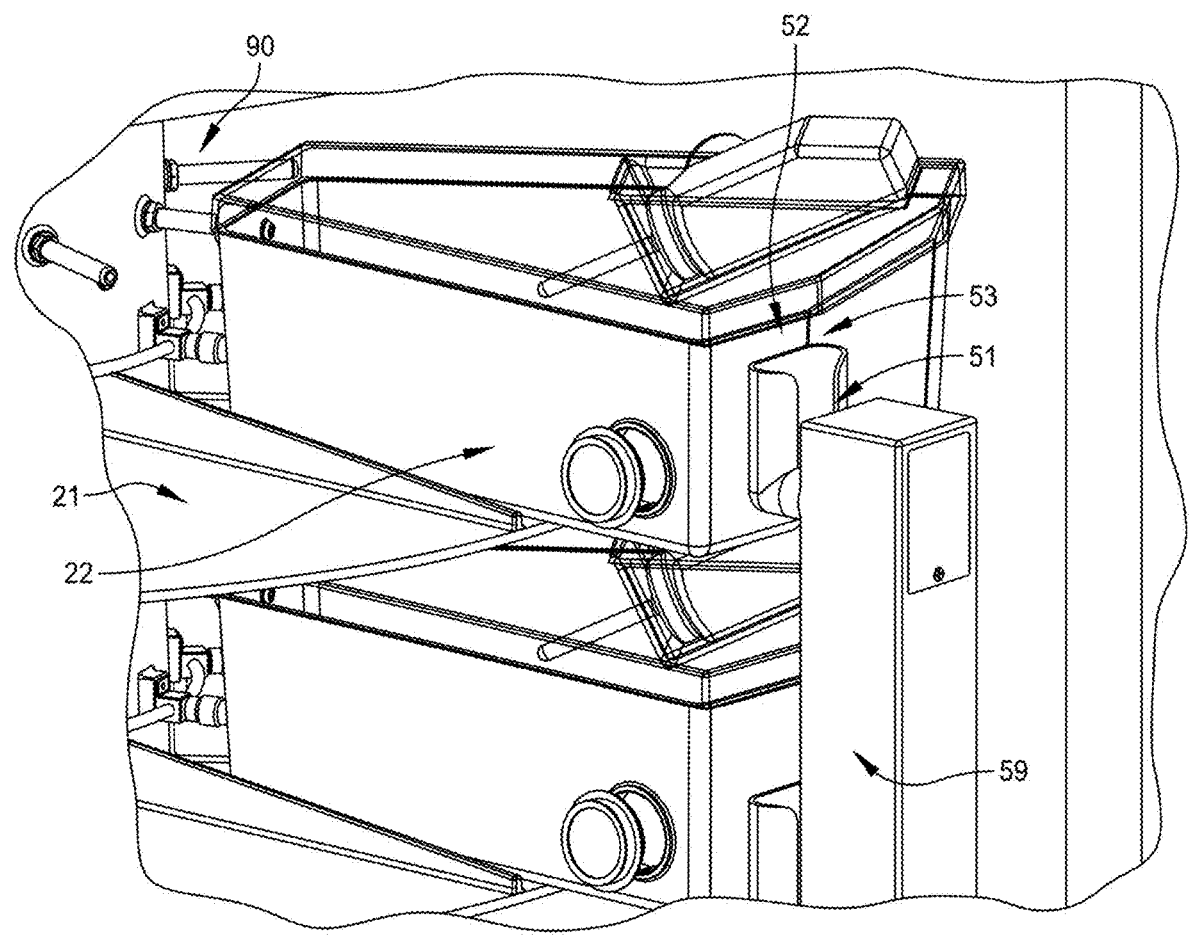
FIG. 6 is a perspective view of a portion of animal caging system.

Referring to FIG. 6, an alternative configuration of sensor arm 51 is shown, in which camera 52 and light source 53 are configured to capture images 81 from a front-facing perspective. Support leg 50 may support camera arms 51 in a variety of configurations, including top-down and front-facing, as well as a combination thereof. In some configurations, support leg 50 may include sensor arms 51 sufficient to capture images 81 of the interior of cage 22 from multiple perspectives simultaneously. In some embodiments, this may allow software interface 80 to reconstruct a three-dimensional digital facsimile of the interior of cage 22 from the images 81 captured by cameras 52.

Referring again to FIG. 1, animal caging system 100 may include a motor assembly 60 configured to rotate carousel-style rack 20 via on-rack drive system 15. Rotation of the carousel-style rack 20 allows one sensor 52 to monitor and collect data from animals in multiple cages 22 on the rack 20. In one embodiment, the motor assembly 60 may be attached to support leg 50. This configuration has the advantage of consolidating all of the electronic components of animal caging system 100 in support leg 50. In other embodiments, motor assembly 60 may be attached to exterior frame 10. Motor assembly 60 may be arranged in any number of configurations suitable for controllably rotating carousel-style rack 20 in order to position individual cages 22 in view of sensor 52, for example, as positioned on support leg 50 or sensor arm 51. Motor assembly 60 may be positioned on the top or bottom of animal caging system 100.

Animal caging system 100 may also include a control interface 70 that may house one or more of the components necessary to operate the system. In one embodiment, control interface 70 may be attached to support leg 50. However, control interface 70 may also be positioned in other locations.

Figure 2:
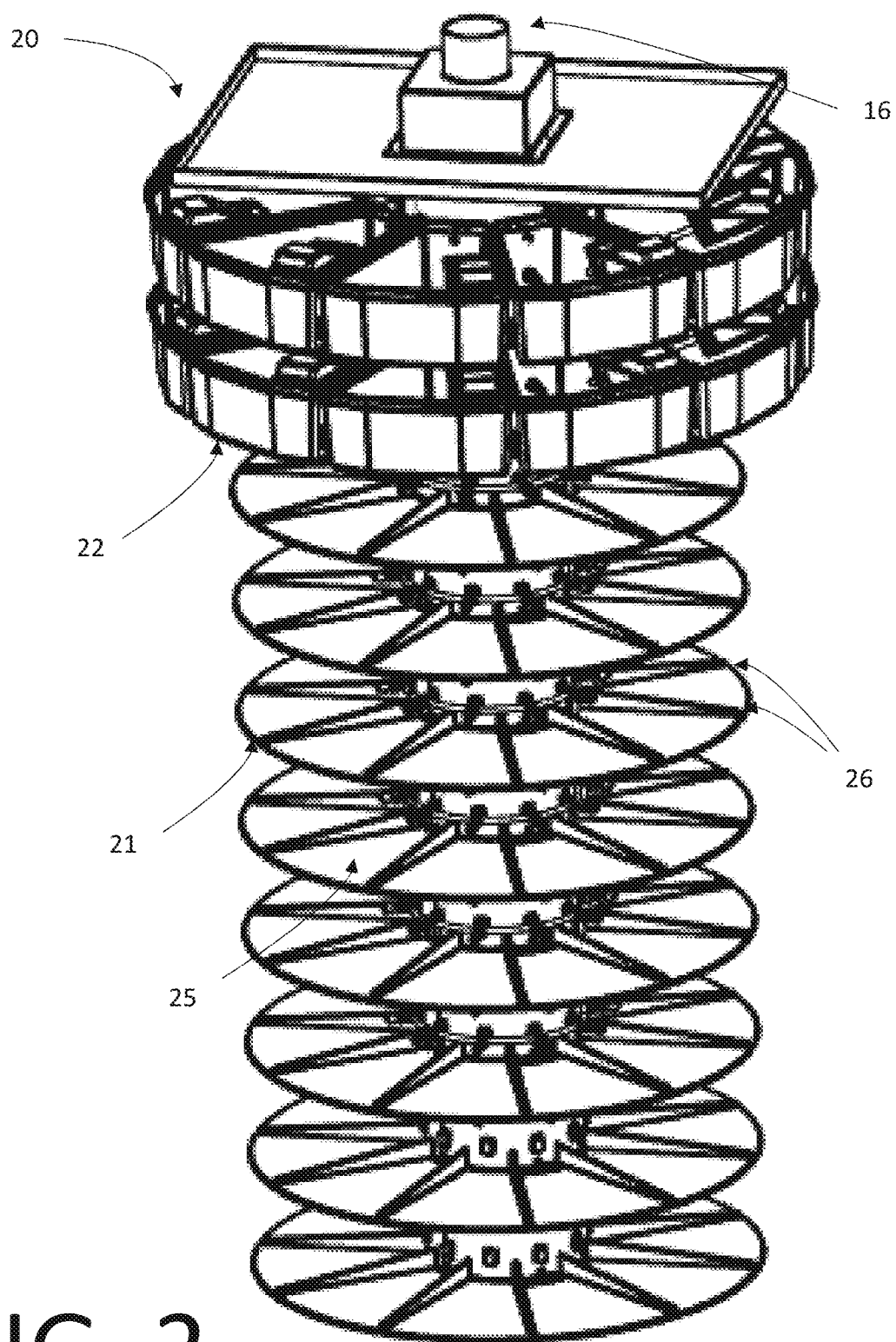
FIG. 2 is a front perspective view of a carousel-style rack.

Referring to FIG. 2, carousel-style rack 20 may include a plurality of platters 21, with each platter 21 having a plurality of cage receptacles 25, separated by cage dividers 26. According to one exemplary embodiment, each platter 21 comprises ten to eleven cage receptacles. Platters 21 may be removably connected to one another, including through corresponding registration marks located on the interfaces between platters. Alternatively, platters 21 may removably connected to a common structure, such as a central shaft 16.

Figure 3:
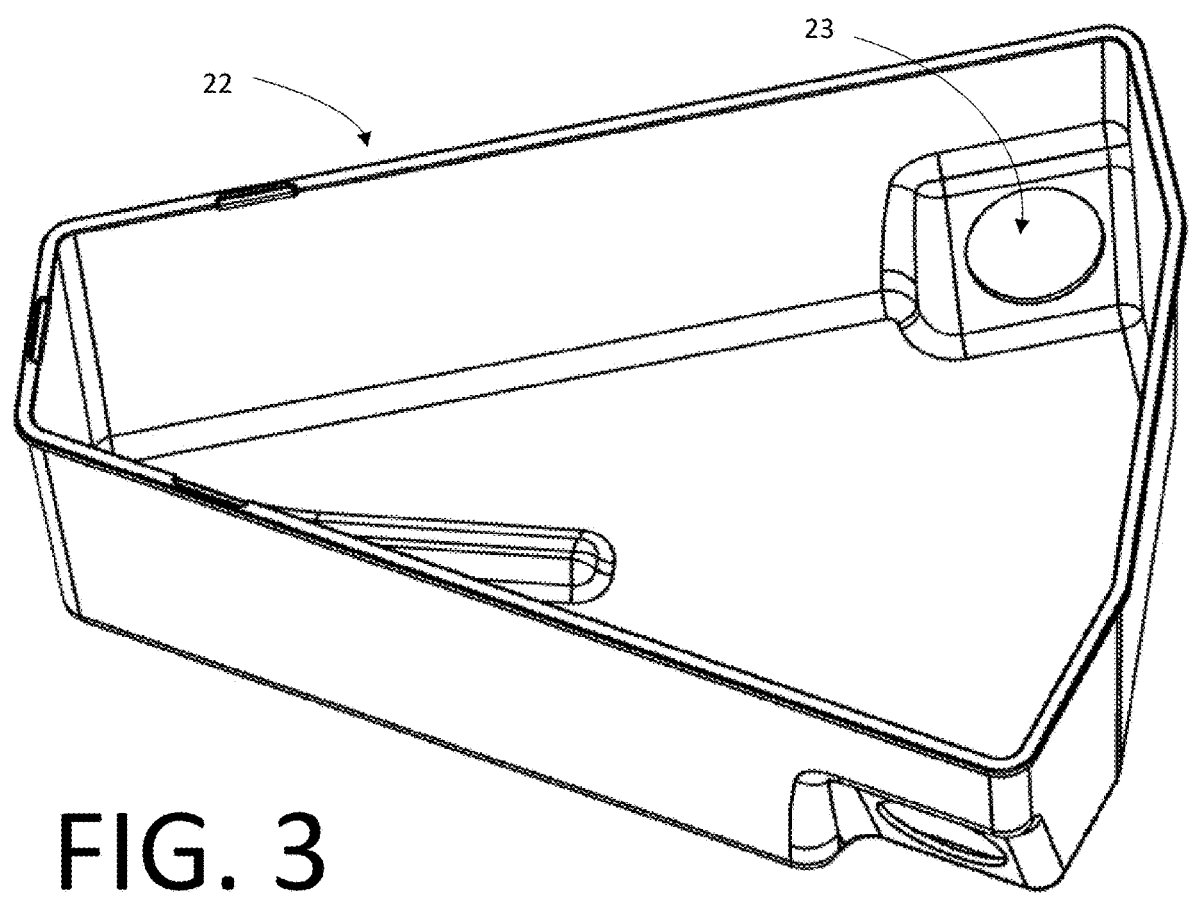
FIG. 3 is a front perspective view of a cage for use with a carousel-style rack.

Referring to FIG. 3, cage 22 may have a generally trapezoidal shape, configured for insertion into cage receptacle 25 of platter 21, between two cage dividers 26. Cage 22 may also include one or more ports 23. Ports 23 may be configured to support air filters or other components for environmental or temperature control, sensors for monitoring the conditions of the cage, automated or manual feeding, water delivery, or for charging said cage according to experimental protocols. Ports 23 may also be capped or restricted when access is not required for use, for the security of the animals being monitored.

Figure 4:
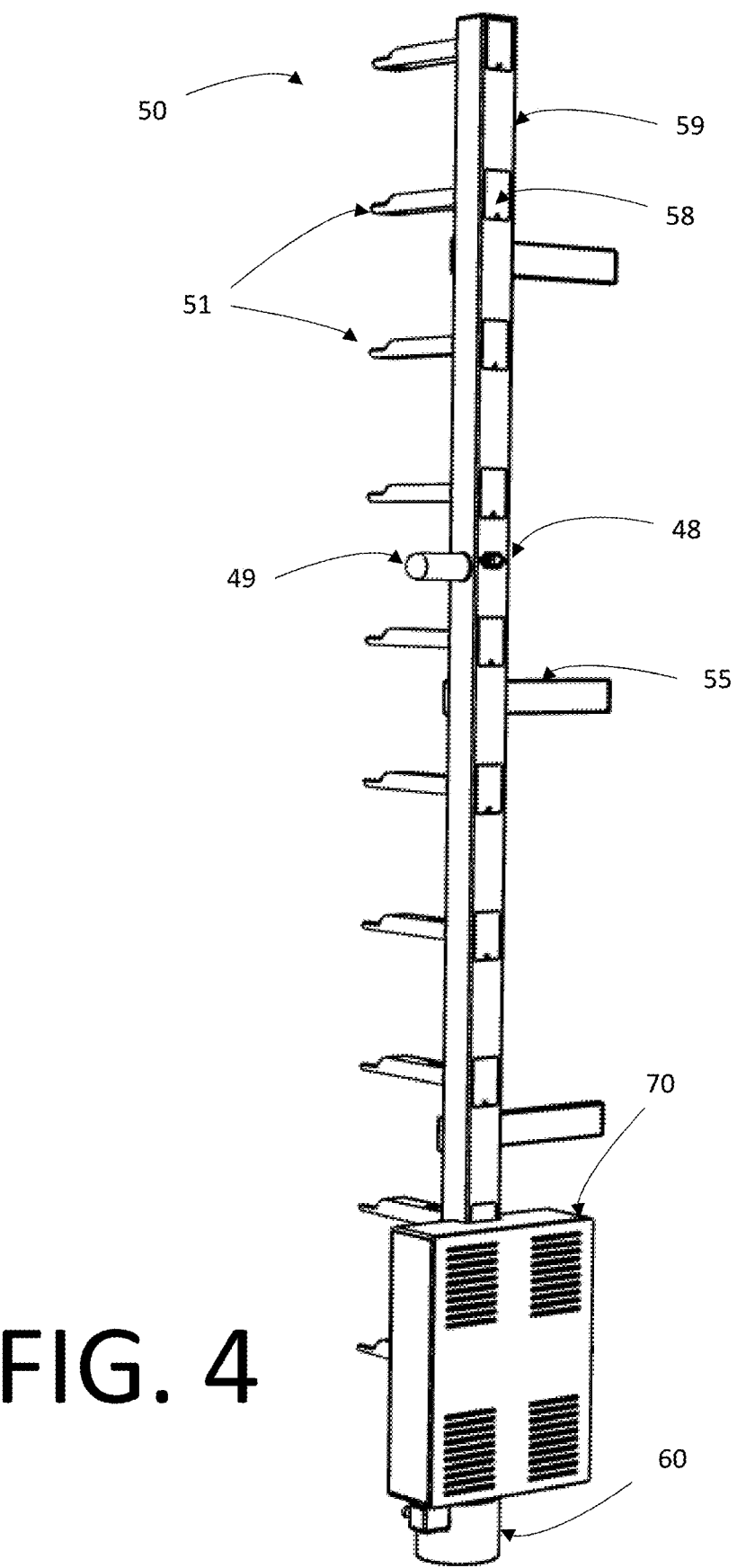
FIG. 4 is a front perspective view of a support leg.
Figure 16:
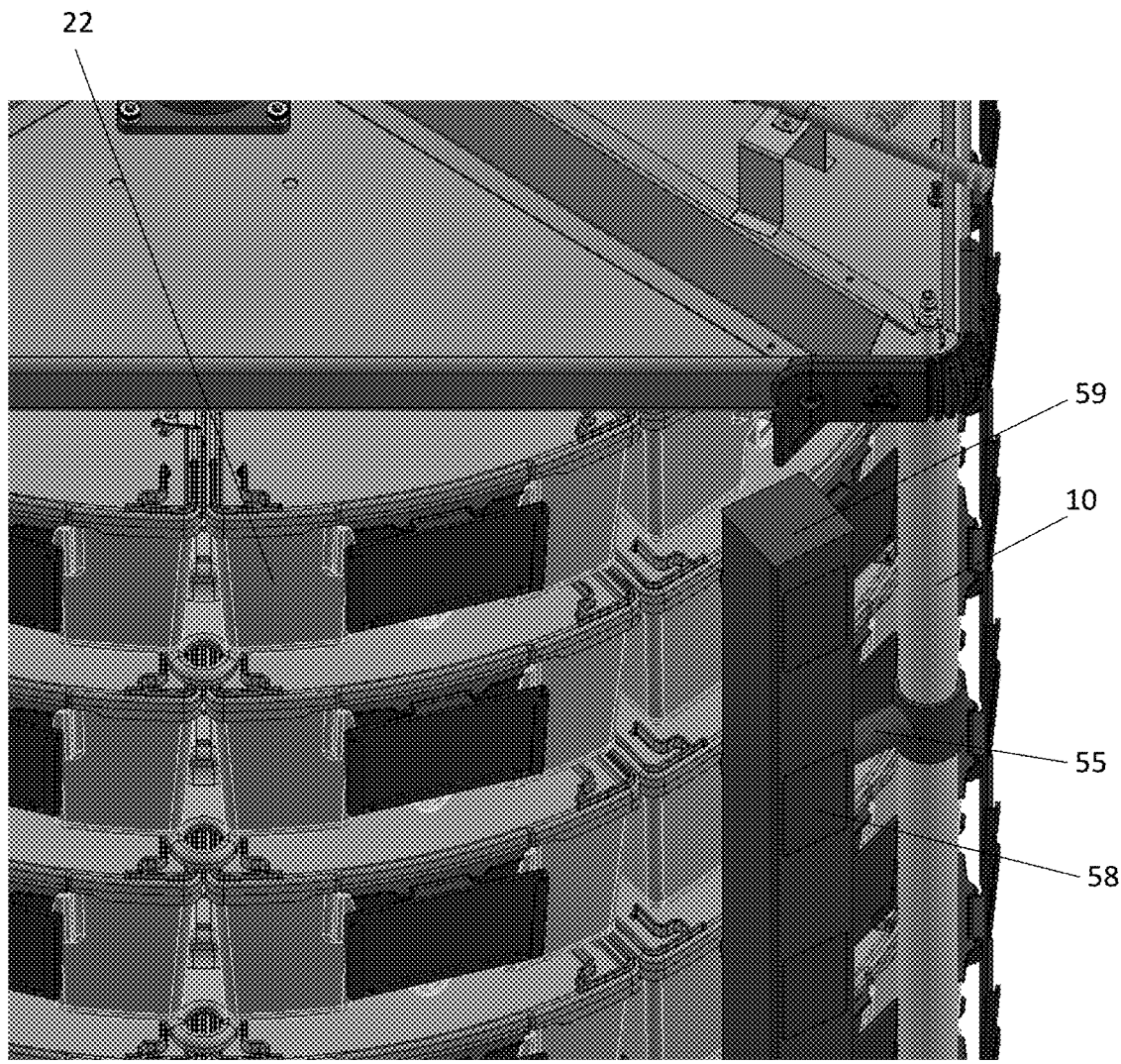
FIG. 16 is a partial perspective view of a support arm.

Referring to FIG. 4, support leg 50 may include a hollow interior space suitable for accommodating wires or other electronic components. One or more access ports 58 may be located on support leg 50, for example, on body 59 of support leg, for providing access to the interior of support leg 50, for example to manipulate wires or other internal components housed within support leg 50. Support leg 50 may be attached to one or more arms 51. Each arm 51 may be configured to align with one platter 21 of the plurality of platters comprising the carousel-style rack 20. In one embodiment, arm 51 is positioned above cage 22 on each platter 21. In other embodiments, arm 51 may be positioned to the front or side of cage 22. Access ports 58 may be positioned opposite or near arm 51 on body 59 of support leg 51. In other embodiments, support leg 50 may not include arm 51. In such embodiments, as shown in FIG. 16, access port 58 may be located opposite or near a sensor 52 or data and/or electrical sockets 47 (shown in FIG. 17).

Support leg 50 may also include a handle 49. In one embodiment, handle 49 is located in an intermediate position of support leg 50, for example, of body 59 of support leg 50, where it can be conveniently gripped by an operator while rotating or removing support leg 50 from animal caging system 100. However, handle 49 may be positioned elsewhere on support leg 50 if it is desirable. In other embodiments, support leg 50 may not include a handle.

In certain embodiments, support leg 50 may include a manual rotation switch 48. The manual rotation switch 48 may be connected to control interface 70 and configured to rotate carousel-style rack 20 when pressed by an operator. In some embodiments, rotation switch 48 is a bi-directional rocker-style switch that is configured to cause the rotation of carousel-style rack 20 either clockwise or counterclockwise depending on the direction that the switch is pressed. In other embodiments, rotation switch 48 may be two separate switches or buttons configured for clockwise or counterclockwise rotation, respectively. In still other embodiments, rotation switch 48 may be a single button or switch configured for unidirectional rotation. In other embodiments, support leg 50 does not include manual rotation switch 48. Instead, rotation may be facilitated through an on-rack drive system 15, described in more detail below.

Support leg 50 may be attached to a control interface 70 configured to operate the electronic components of the sensor arm 51.

Figure 7:
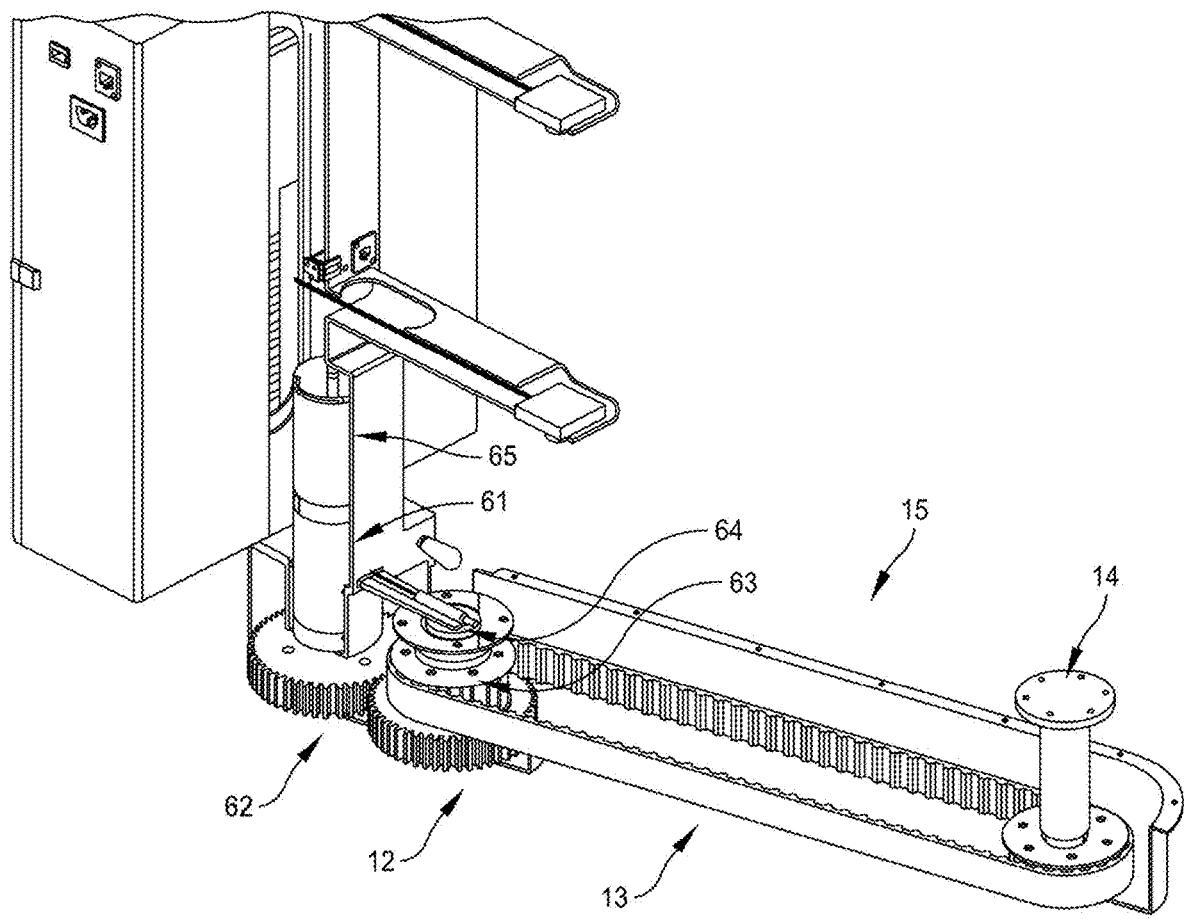
FIG. 7 is a cross-section of a motor assembly in engagement with an on-rack drive system.

Referring to FIG. 7, motor assembly 60 may comprise a motor 61 and a motor encoder 65 for translating the rotation of the motor 61 into positional data that animal caging system 100 may use to determine the position of the carousel-style rack 20 relative to arms 51. Motor assembly 60 may include a spur gear 62 for removable engagement with a corresponding spur gear of an on-rack drive system 15 (optionally gear 12 as shown in FIG. 7) located on exterior frame 10. Motor assembly 60 may also include a position sensor 63 to allow animal caging system 100 to determine when the support leg 50 or sensor arm 51 is located in a position suitable for monitoring cages 22, and an engagement locking mechanism 64 for locking the support leg 50 or sensor arm 51 in position once animal caging system 100 determines that sensor is located in a position suitable for monitoring cages 22, in order to keep spur gear 62 and corresponding spur gear 12 engaged with one another during operation.

Motor assembly 60 may be located at the bottom of support leg 50, for engagement with corresponding spur gear 12, which may be located on a bottom surface of exterior frame 10. In another embodiment, motor assembly 60 may be located on the top of support leg, for engagement with corresponding spur gear 12, which in that configuration may be located on a top surface of exterior frame 10. It should be appreciated that motor assembly 60 may be located in any number of positions suitable for causing the rotation of carousel-style rack 20.

Figure 8A:
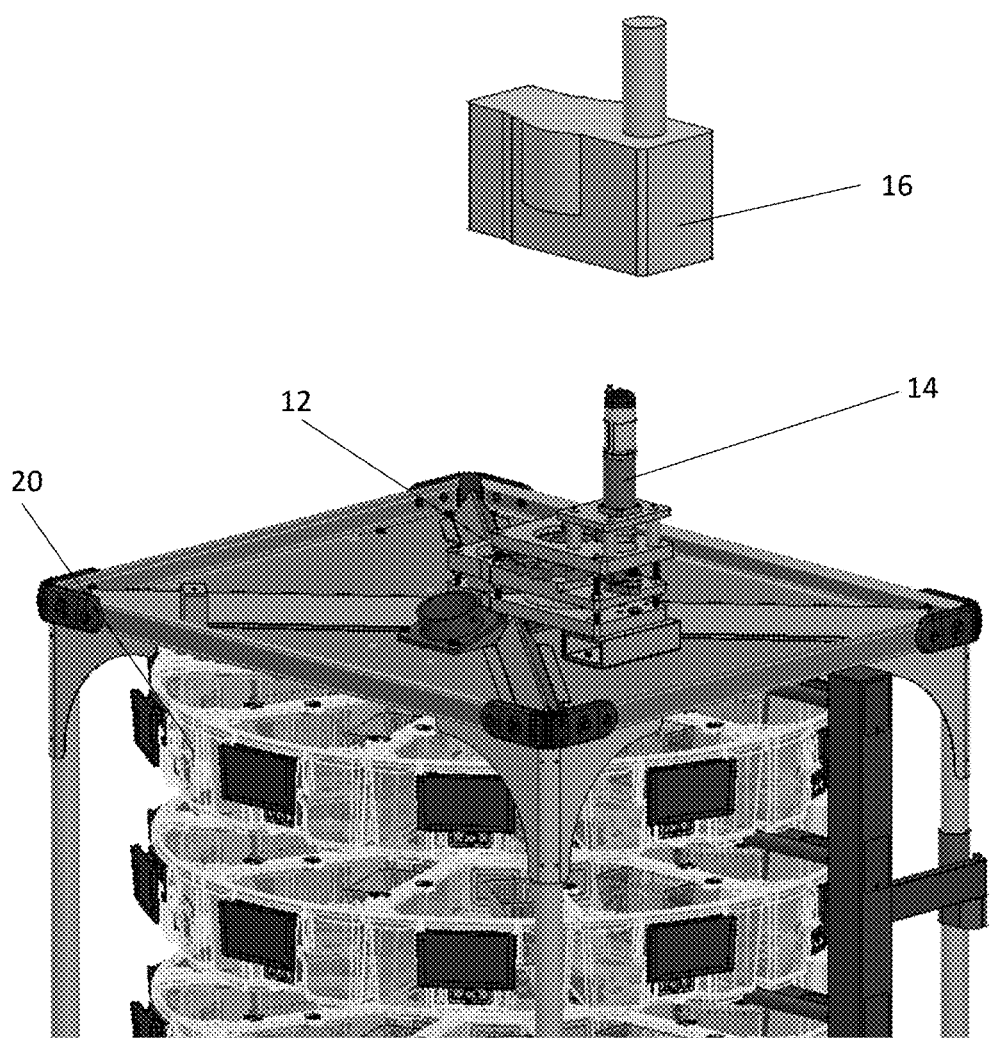
FIG. 8A is a perspective view of a partial animal caging system including an on-rack drive system.
Figure 8B:
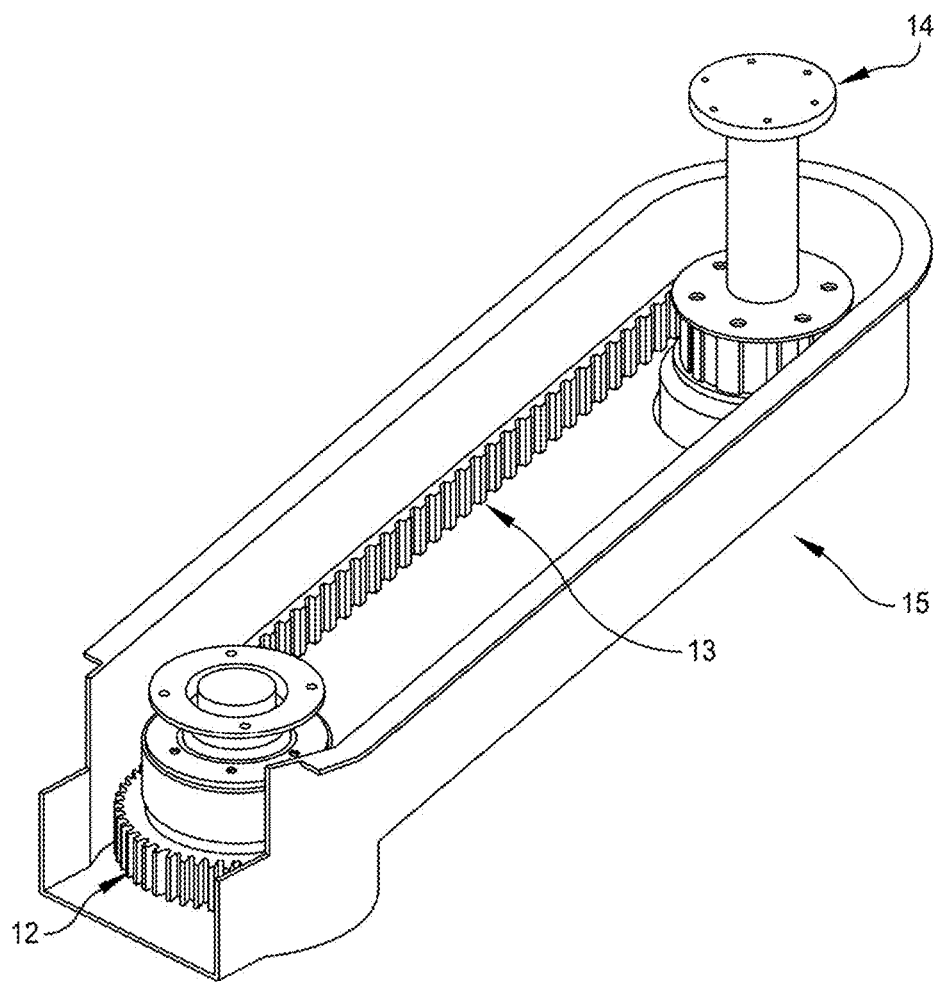
FIG. 8B is a top perspective view of an on-rack drive system.

Referring to FIG. 8A, rotation of the carousel-style rack 20 may be facilitated through an on-rack drive system 15. Drive cover 16 may be positioned over on-rack drive system 15. In one embodiment, on-rack drive system 15 comprises corresponding spur gear 12 and an interface 14 configured to engage the on-rack drive system 1 with carousel-style rack 20. In an alternate embodiment, as shown in FIG. 8B, on-rack drive system 15 comprises corresponding spur gear 12, a belt drive 13, and interface 14. In operation, according to certain embodiments, motor 61 drives spur gear 62, which is in engagement with corresponding spur gear 12. Corresponding spur gear 12 translates its rotation to directly to interface 14 (for embodiments that are free of a belt drive) or to belt drive 13 which rotates interface 14, and thereby causes the rotation of carousel-style rack 20. It should be appreciated that additional or alternate mechanisms for rotating carousel-style rack 20 may be utilized.

Figure 9:
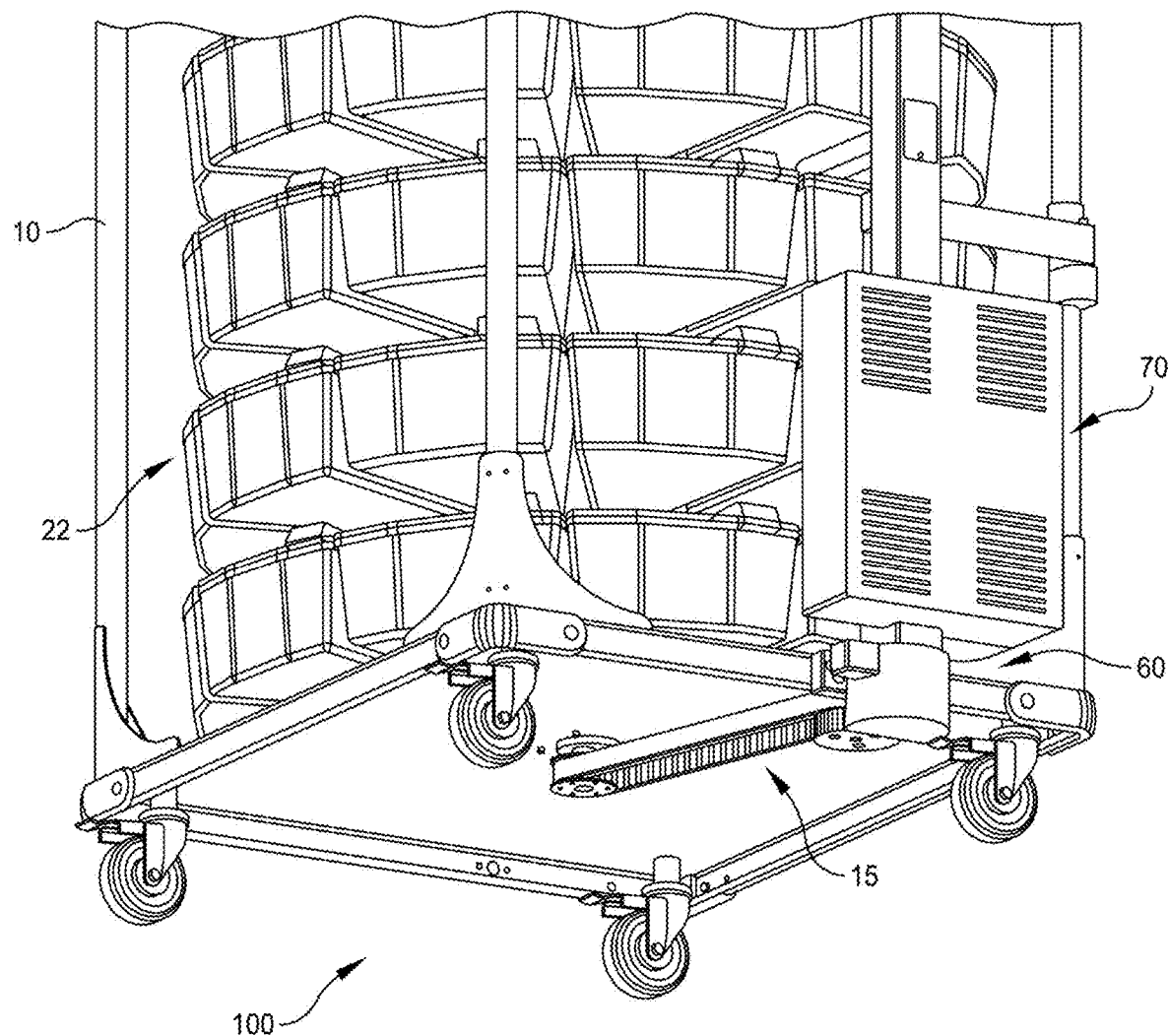
FIG. 9 is a perspective view of an animal caging system including an on-rack drive system.

Referring to FIG. 9, an alternate configuration of animal caging system 100 is shown, in which on-rack drive system 15 is located on the bottom of frame 10.

On-rack drive system 15 may be configured for removable engagement with motor assembly 60, for example, by disengaging spur gear 12 from interface 14 and/or by disengaging spur gear 62 from corresponding spur gear 12. In accordance with certain embodiments, on-rack drive system 15 may automatically disengage motor assembly 60 when not in use. On-rack drive system 15 may then engage motor assembly 60 for rotation of cage rack 20 at the direction of control interface 70. Once the rotation is complete, on-rack drive system 15 may then again automatically disengage motor assembly 60. In some embodiments, the system may allow for manual rotation of cage rack 20 when on-rack drive system 15 is disengaged from motor assembly 60. After manual rotation, the caging system 100 may use position sensor 63 to determine the position of cage rack 20. In other embodiments, cage rack 20 may be locked from rotation when on-rack drive system 15 is disengaged from motor assembly 60. Various mechanisms may be utilized for removable engagement between spur gear 12 and spur gear 62.

Figure 10A:
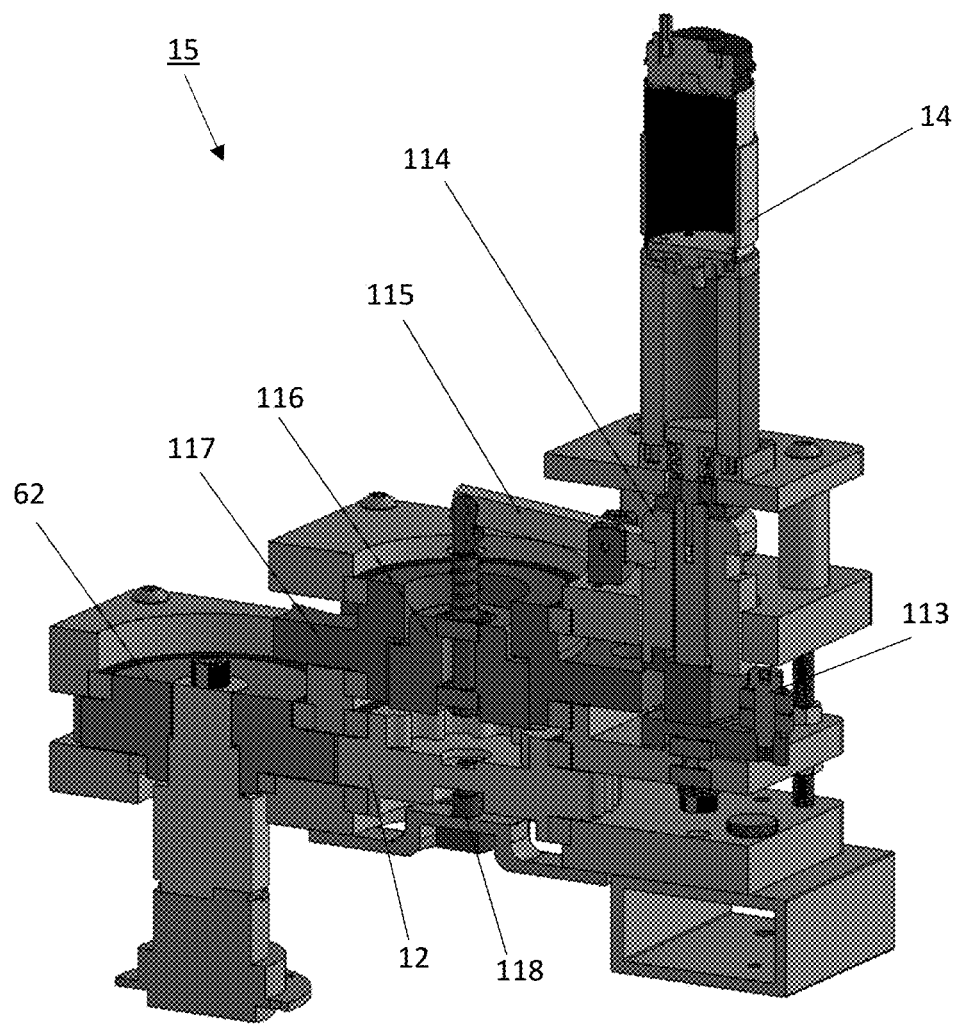
FIG. 10A is a cross-section of an on-rack drive system.

Referring to FIG. 10A, on-rack drive system 15 includes crank 113, cam 114, cam lever 115, and disconnecting spline 116 configurable to mechanically clock spur gear 12 to wheel 117, which translates rotation from interface 14 to spur gear 12. In use, crank 113 engages cam 114 operably connected to raise or lower cam lever 115. Cam lever 115 may position spline 116 internally within wheel 117 to disengage spur gear 12 from wheel 117 (in a raised position) or internally within spur gear 12 to engage spur gear 12 with wheel 117 (in a lowered position). In the raised position, interface 14 does not translate rotation to spur gear 12. In the lowered position, interface 14 is capable of translating rotation to spur gear 12 via wheel 117. Sensor 118 is used to detect whether spline 116 is disengaged or engaged. Sensor 118 and crank 113 may be operably connected to control interface 70. In an alternate embodiment, an electromagnetic clutch may replace spline 116 to engage/disengage the on-rack drive system 15.

Sensor 118 may be an encoder, for example, an incremental encoder or an absolute encoder. Sensor 118 may be configured to monitor one of spur gear 12 and spur gear 62 and operably connected to control interface 70. Sensor 118 may be operably connected and configured to relay position information of the cage rack 20, such as which cage 22 is facing support leg 50 and/or sensor arm 51, whether support leg 50 or sensor arm 51 is located in a position suitable for monitoring cages 22, whether on-rack drive system 15 is engaged or disengaged from motor assembly 60, and number of revolutions of the cage rack 20 that were made manually (while on-rack drive system 15 was disengaged) or over a predetermined period of time or lifetime of the system. An absolute encoder may be capable of measuring speed of rotation and provide position information at any given time. An incremental encoder may be capable of measuring a change in position. Using data from the incremental encoder, the control interface 70 or software interface 80 may determine the position information of the cage rack 20.

Figure 10B:
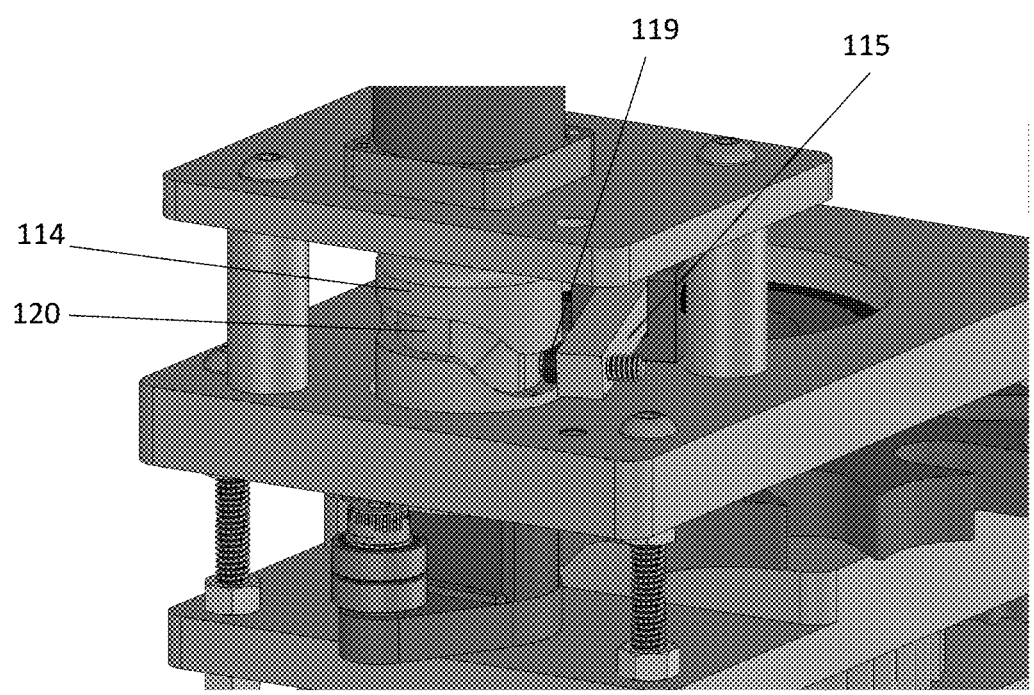
FIG. 10B is a perspective view of a portion of an on-rack drive system.

In one exemplary embodiment, referring to FIG. 10B, cam 114 may comprise a curved or serpentine drive channel 120. Cam lever 115 may comprise a cam follower 119 extending from one side of cam lever 115. In use, crank 113 may drive cam 114 to rotate. When rotating, cam follower 119, positioned within drive channel 120, may be driven up and down through the curved or serpentine channel, raising and lowering cam lever 115, and respectively raising and lowering spline 116 to engage and disengage spur gear 12.

Figure 10C:
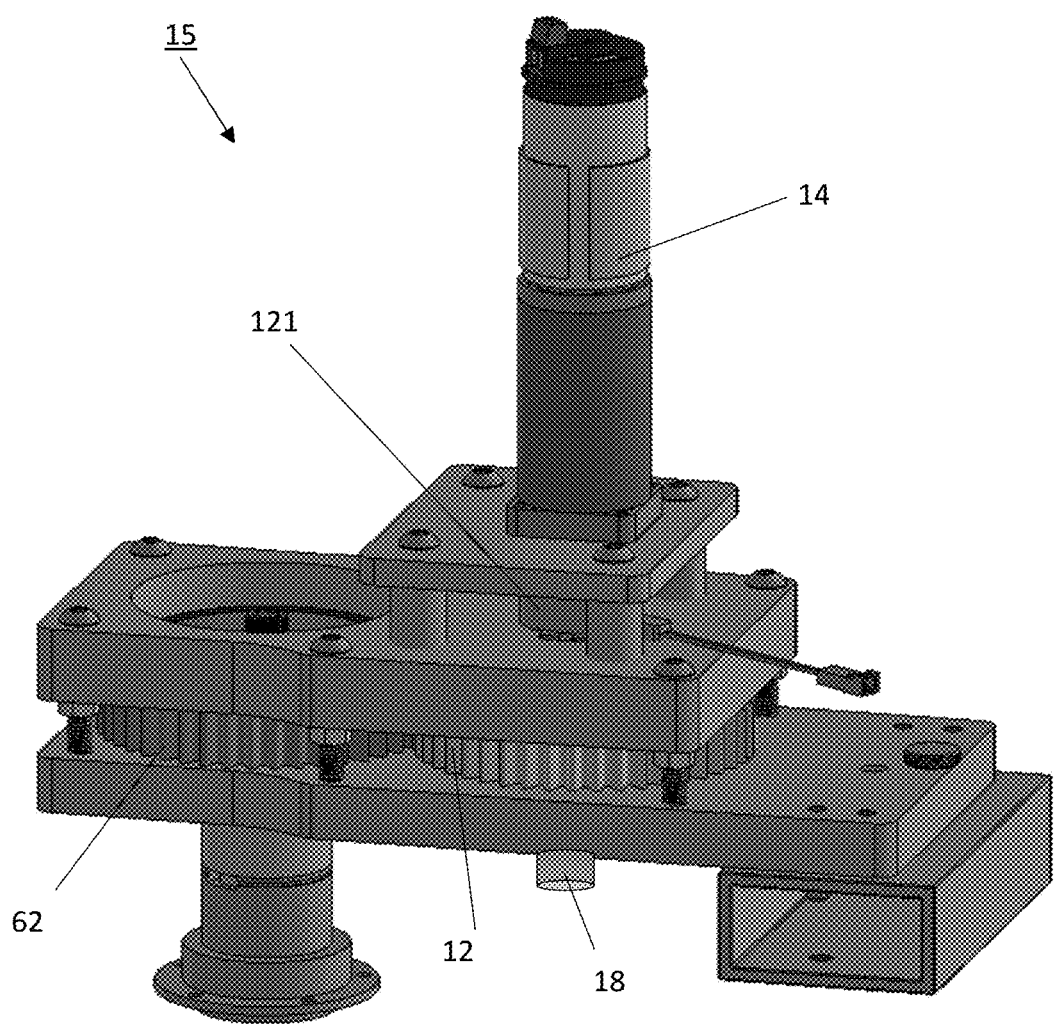
FIG. 10C is a perspective view of an on-rack drive system.

In another exemplary embodiment, referring to FIG. 10C, on-rack drive system 15 includes electromagnetic clutch 121 configured to engage spur gear 12 to spur gear 62. In the embodiment of FIG. 10C, interface 14 directly translates rotation to spur gear 12. In the engaged position, spur gear 12 is mechanically clocked with spur gear 62 and capable of translating rotation. In the disengaged position, spur gear 12 is not mechanically clocked with spur gear 62 and does not translate rotation. Sensor 118 may be operably connected and configured to relay position information of the cage rack 20 and whether spur gear 12 is engaged or disengaged. Electromagnetic clutch 121 and sensor 118 may be operably connected to control interface 70.

Figure 10D:
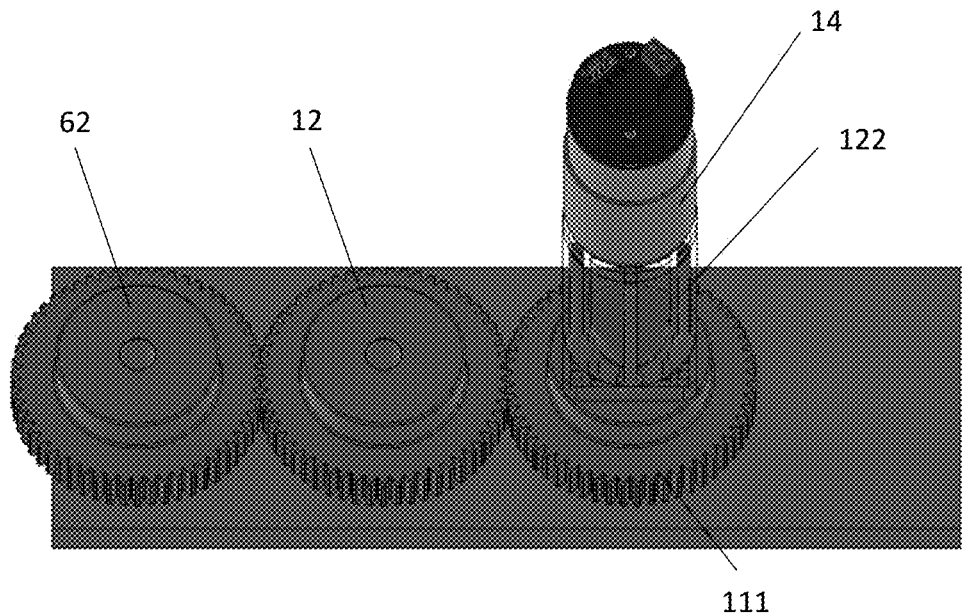
FIG. 10D includes two top perspective views of a portion of an on-rack drive system.
Figure 10D:
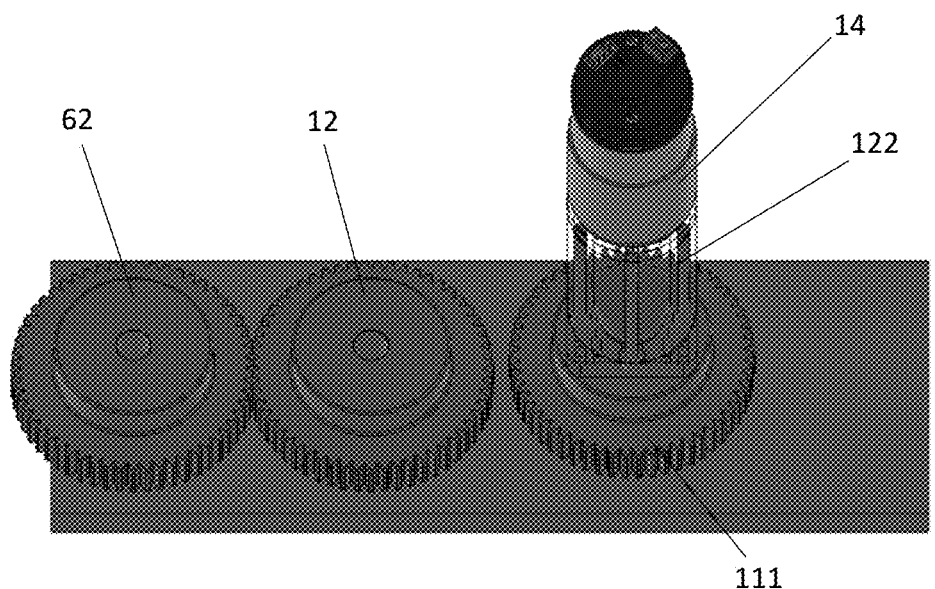

In another embodiment, referring to FIG. 10D, actuator 122 is associated with drive spur gear 111 that translates rotation from interface 14 to spur gear 12. Actuator 122 may be configured to engage/disengage drive spur gear 111 with spur gear 12, as shown in the two views of FIG. 10D. Actuator 122 may be operably connected to control interface 70. The embodiment of FIG. 10D is otherwise similar to the embodiment of FIG. 10C.

While several mechanisms have been described for removable engagement of on-rack drive system 15, it should be understood that additional and alternate mechanisms may be utilized.

Figure 11:
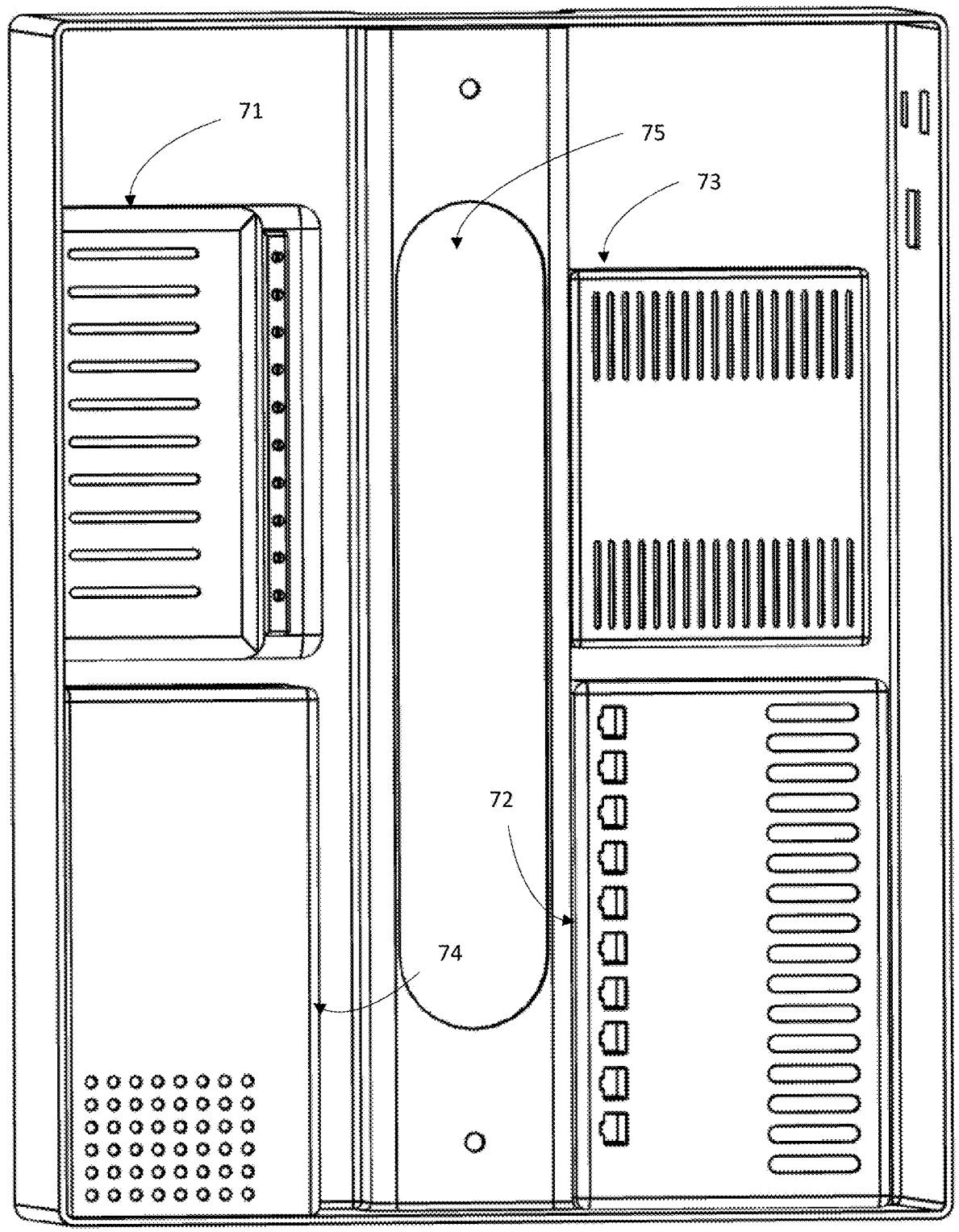
FIG. 11 is a front perspective view of a control interface.

Referring to FIG. 11, control interface 70 may comprise a device hub 71 configured to provide data and electrical connections to each sensor 52 and other electrically driven components, such as light source 53, a communication hub 72 configured for wired or wireless data transmission according to communication protocols such as ethernet, WiFi, or similar methods of digital communication known in the art, a motor controller 73, configured to operate the motor assembly 60, and a power supply 74. Control interface 70 may also comprise an access port 75 connecting control interface 70 with the interior of support leg 50 to allow access to internal wiring. Thus, in certain embodiments, components of the monitoring system, such as sensor 52, light source 53, and motor controller 73 of motor assembly 60, may be operably connectable to a database or interface or one another via communication hub 72.

Components of animal caging system 100 may be associated with software interface 80. Software interface 80 may allow a user to review data obtained by sensor 52 and/or operate the various components of animal caging system 100, such as sensor 52, light source 53, and motor assembly 60, via control interface 70. Thus, software interface 80 may be operably connected to control interface 70, for example, via a communication hub 72. Software interface 80 may be executed on a control unit, such as a computer, mobile device, or other processor mounted on animal caging system 100. In some embodiments, software interface 80 may be executed on an external control unit, such as a computer, mobile device, or other processor connectable to control interface 70 via a local area network (LAN) or remote network, optionally accessed via a virtual private network (VPN).

In certain embodiments, the system is programmed to comply with National Institute of Standards and Technology's (NIST) Cybersecurity Framework. Thus, in some embodiments, access to control interface 70 and data transmitted through control interface 70 may be restricted to local area networks. In some embodiments, the connection between control interface 70 and software interface 80 may be restricted to local area networks. Data transmitted to and from control interface 70 and/or software interface 80, and data stored on software interface 80 or a data storage device associated with software interface 80, may be encrypted. In other embodiments, control interface 70 may be accessible through a remote network, such as via a cloud-based network.

Software interface 80 may be configured to receive data captured by the sensor. Software interface 80 may display the data in a readable format to the user. Software interface 80 may be programmed to interpret the data captured by the sensor 52, for example, to detect status information or identifying information from images captured by a camera. In some embodiments, software interface 80 may be programmed to interpret the data, such as one or more images, captured by the sensor to generate identifying information associated with the animal or animal cage, such as text, a barcode, or a QR code from an animal tag or cage label. In some embodiments, software interface 80 may be programmed to interpret the data, such as one or more images, captured by the sensor to generate status information indicative of a status of the animal or cage. Software interface 80 may be programmed to alert a user to the status of the animal, such as notify a user of a current status, notify a user of a change in status, or notify a user of a detected event. Exemplary status information that may be identified by the software interface 80 include, for example, one or more of: an animal vital sign (such as body temperature, pulse rate, respiration rate (rate of breathing), blood pressure), an animal birth event, an animal death, an animal experiencing an elevated immune response, a low level of animal food, a low level of animal water, an animal cage flooding, or an animal cage dirty bedding.

Software interface 80 may be configured to transmit operating instructions for the system, as programmed by a user. Software interface 80 may display program options in menu format to a user and allow a user to select protocols for execution by control interface 70. For example, software interface 80 may enable a user to set and modify schedules, such as rotation and monitoring schedules. Software interface 80 may be associated with a data storage device, such as a local data storage device, a local network data storage device, or a remote network data storage device (for example, a cloud-based data storage device). Software interface 80 may monitor data received by sensor 52 (and/or position sensor 74 or sensor 118, described in more detail below) and optionally record and/or notify a user of such data, for example, responsive to a threshold value detected. Software interface 80 may enable a user to set and modify such threshold values for recording data or transmitting a notification to a user. Software interface 80 may enable a user to modify operating instructions for the system responsive to such data, for example, responsive to the threshold value detected. In some embodiments, software interface 80 may allow a user to annotate and edit data. Software interface 80 may be connectable to a local information management system or a local software integration for transferring data.

Software updates may be transmitted to software interface 80 periodically by a manufacturer of the system. Optionally, software interface 80 may be programmable by third parties, such as capable of accepting programs developed by third parties that are downloadable to software interface 80 by a user. In such embodiments, software updates may be transmitted to software interface 80 by third parties at the direction of the user. Software interface 80 may require that certain program parameters be met before allowing users to download such programs developed by third parties, such as certain operating parameters and/or cybersecurity parameters.

Animal caging system 100 contemplates several mechanisms for controlling the rotation of carousel-style rack 20. In some embodiments, control interface 70 receives data from motor encoder 65, indicative of the amount of rotation of carousel-style rack 20. Where the radial distance between cages and the gear ratio of spur gear 62 and corresponding spur gear 12 are known, motor encoder 65 provides all of the information necessary for control interface 70 to know when the sensor 52 is positioned to monitor a target animal, for example, when camera 52 is positioned to observe a particular cage 22, based on a known starting position for the cages 22 and sensor 52.

In another embodiment, position sensor 63 provides additional information to control interface 70 to ensure that data is only collected when sensor 52 is appropriately positioned, for example, images are only taken when camera 52 is positioned to view the full interior of cage 22 or data is only collected when sensor 52 is positioned within range to collect the data from the animal cage. For example, position sensor 63 may be an analog switch or a contactless digital switch configured to engage with registration marks on carousel-style rack 20. When the analog switch is depressed or released or a contactless digital switch as it encounters the appropriate registration mark during rotation, the signal from the position sensor 63 may indicate to the control interface 70 that the sensor 52 is correctly positioned, for example, camera 52 is correctly positioned to take an image 81. Alternatively, position sensor 63 may be an optical sensor configured to respond to changes in the light reflected by optical patterns on the carousel-style rack 20. Other types of position sensors may be utilized without departing from the spirit of this disclosure.

In another embodiment, rotation of carousel-style rack 20 may be controlled by a Geneva mechanism. For example, motor 61 may actuate a driver having a pin or roller at a radial position on the driver configured to fit within regularly-spaced slots on a follower attached to carousel-style rack 20. When the pin engages with the slot, the driver and the follower rotate together. When the pin disengages with the slot, and the follower stops moving until the driver completes its rotation and engages with the next regularly-spaced slot. In this way, the motor 61 may rotate at a constant rate, while causing intermittent rotation of the carousel-style rack 20. The follower may have a number of slots equivalent to the number of cages that may be supported in a single carousel-style rack. For example, a carousel-style rack 20 configured to support 10 cages may have a follower with ten slots spaced as shown below:

| | Cage | | | | | | | | | |
|---|---|---|---|---|---|---|---|---|---|---|
| | 1 | 2 | 3 | 4 | 5 | 6 | 7 | 8 | 9 | 10 |
| slot position | 0° | 36° | 72° | 108° | 144° | 180° | 216° | 252° | 288° | 324° |

In that way the intermittent rotation may be configured to pause the rotation of the carousel-style rack 20 once for each cage 22 on each rotation of the carousel-style rack 20. Position sensor 63, which may be an analog mechanical sensor, a digital optical sensor, or similar type of sensor, may be configured to detect the rotational position of carousel-style rack 20, or an indication that carousel-style rack 20 has paused its rotation, and indicate to control interface 70 or software interface 80 that a cage 22 is in a position suitable for capturing images 81.

In another embodiment, camera 52 may be configured to continuously capture visual data, which may be interpreted by control interface 70 or software interface 80 to detect the position of carousel 20 or cage 22, and/or determine when the camera 52 is correctly positioned with respect to a cage 22 to take an image 81. For example, where camera 52 is configured to observe the entire interior of a cage 22, control interface 70 or software interface 80 may be configured to process the images from camera 52 to detect when all of the edges of the cage 22 are in frame, thus indicating when an image 81 can be captured. Alternatively, control interface 70 or software interface 80 may be configured to detect when identifying information, such as a barcode, a QR code, or text, is found in a given position of the camera's 52 field of view, such as on a camera tag or cage label, thus indicating that camera 52 is correctly positioned relative the animal or cage 22 associated with that information. Information associated with a cage 22 that is captured by a camera 52 can be used for other purposes by the control interface 70 or software interface 80, such as providing status information about cage 22 or the animals being monitored therein that can be associated with images 81 for that cage 22, or for providing instructions to the software interface 80 indicating when or how frequently to capture images 81. Control interface 70 or software interface 80 may be configured to capture and store images 81 in a variety of formats. For some applications images 81 may be still photographs. In other applications, the images 81 may be multiple images taken over a period of time. Or, control interface 70 or software interface 80 may be configured to capture images 81 as streaming video.

Figure 12:
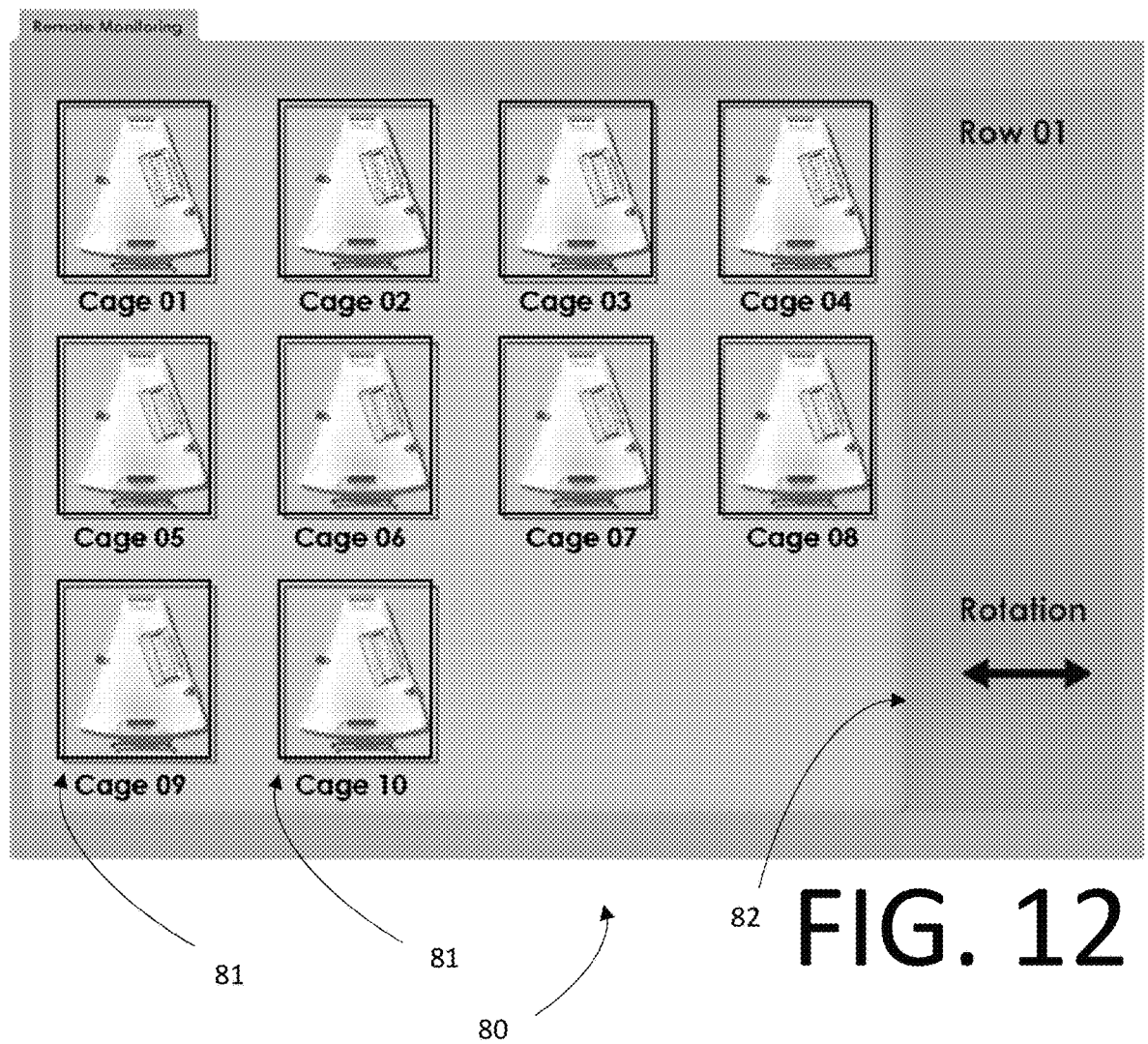
FIG. 12 is a view of a software interface.

Referring to FIG. 12, one embodiment of software interface 80 for animal caging system 100 is shown. In FIG. 12, software interface 80 shows images 81 from camera 52 as it monitors each cage 22 on carousel-style rack 20. Images 81 may be a live feed of what camera 52 is monitoring at that moment. Images 81 may also comprise cached or saved data recorded by each camera 52 over a suitable period of time. In one embodiment, software interface 80 shows a simultaneous visual feed from each of the ten cameras 52. Alternatively, software interface 80 may be configured to show a visual feed from more cameras 52 if they are available, or fewer than all of cameras 52. Or, software interface 80 may show most images 81 available for each cage 22 on the carousel-style rack 20, which updates as new cages 22 come within the field of view of the cameras 52. Software interface 80 may also show a visual feed from one or more cameras 52 selected by a remote operator. Or it may cycle from among the visual feeds of cameras in the system. Software interface 80 may also include software controls 82 for controlling the rotation of carousel-style rack 20. Software interface 80 may include configurations for rotating the carousel-style rack 20 responsive to data obtained from one or more sensor. Alternatively, software interface 80 may include configurations for rotating the carousel-style rack 20 according to a schedule.

Software interface 80 may provide an operator with a variety of ways to review images 81 captured by animal caging system 100. In some embodiments, software interface 80 may show the most recent image 81 captured of each cage 22. In some embodiments, an operator may be able to make a selection corresponding to a given cage 22 and view either all images 81 or the most recent several images 81 associated with that cage 22. In some embodiments, a series of images 81 may be presented as time lapse video. In other embodiments, a series of images 81 may be maintained as separate files. Alternatively, saved images 81 may be transmitted to an external device for storage or further processing. The external device may be a cloud-based storage or processor.

Additionally, software interface 80 may be configured to process additional information associated with cages 22. For example, because animal caging system 100 contemplates the use of cameras 52 capable of receiving infrared signals, or hyperspectral imaging, software interface 80 may be configured to detect thermal changes that may be indicative of birthing events, an animal undergoing an immune response, an animal death, or other events that may be detectable through imaging. Where water, a food source, or bedding may be visible within the camera's 52 field of view, software interface 80 may be configured to detect when an animal needs to be fed, or its water or bedding supplemented or replaced.

Figure 13:
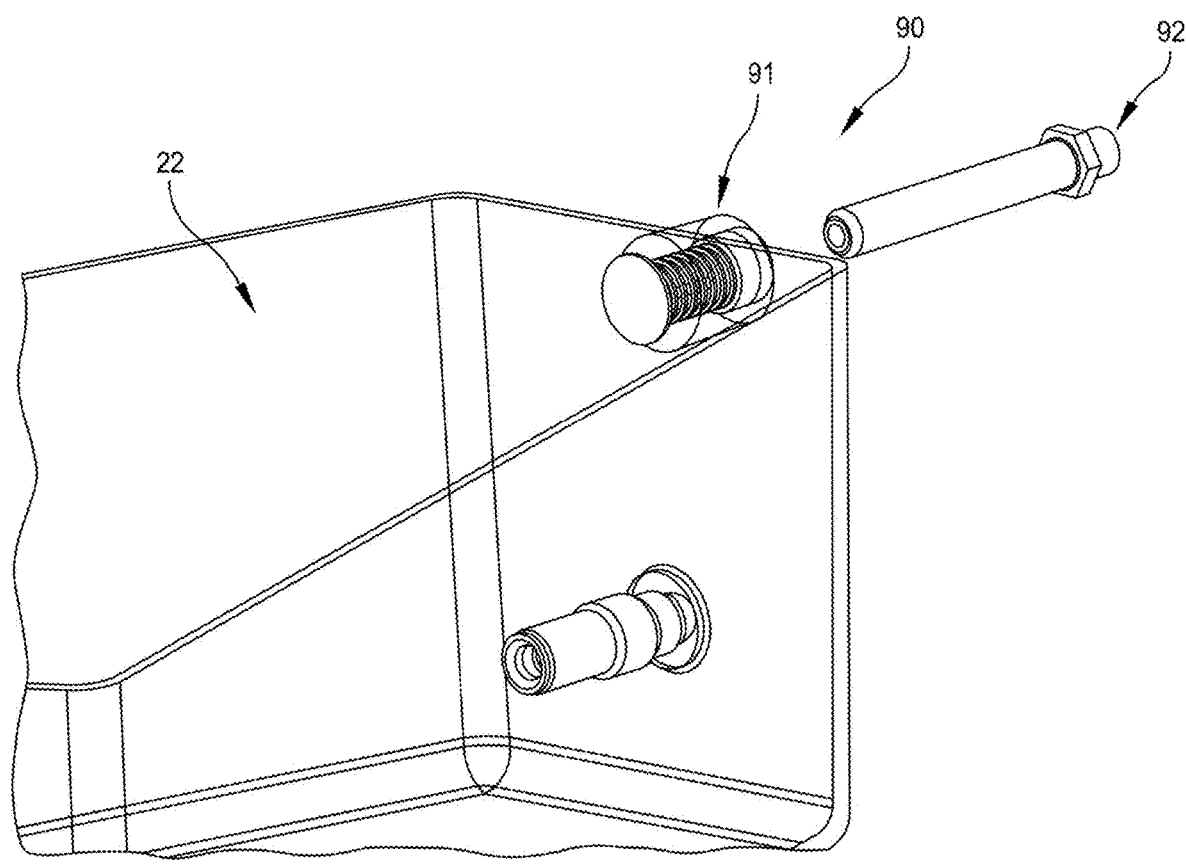
FIG. 13 a perspective view of a cage including an exhaust airflow system.

Animal caging system 100 may also include an exhaust airflow system 90. Referring to FIG. 13, exhaust airflow system 90 may include a plunger seal 91 located on the surface of cage 22. Plunger seal 91 may be configured to connect to nozzle 92 located on carousel-style rack 20. When nozzle 92 and plunger seal 91 are disconnected, plunger seal 91 is held in a closed position, such as by the expansive force applied by a spring under compression. When cage 22 is inserted into carousel-style rack 20 having exhaust airflow system 90, nozzle 92 may be inserted into plunger seal 91. Nozzle 92 thereby imparts a compressive force on plunger seal 91, opening plunger seal 91 and allowing air to pass between the interior of the cage and nozzle 92. Nozzle 92 and plunger seal 91 may be held in engagement with one another by a variety of methods known in the art, including through a friction bond, a mechanical latch, a spring-loaded locking lug, or by similar mechanisms known in the art. In some embodiments, the exhaust airflow system 90 includes a spacer to accommodate system components, such as control interface 70. The spacer may be positioned between plunger seal 91 and nozzle 92. The spacer may be positioned between nozzle 92 and an exhaust hose.

Nozzle 92 may connect to a negative pressure source that may be integrated with animal caging system 100. Alternatively, the negative pressure source may be external to animal caging system 100. When nozzle 92 and plunger seal 91 are connected, the negative pressure source creates an airflow gradient drawing the air inside cage 22 through nozzle 92, away from the cage.

Figure 14:
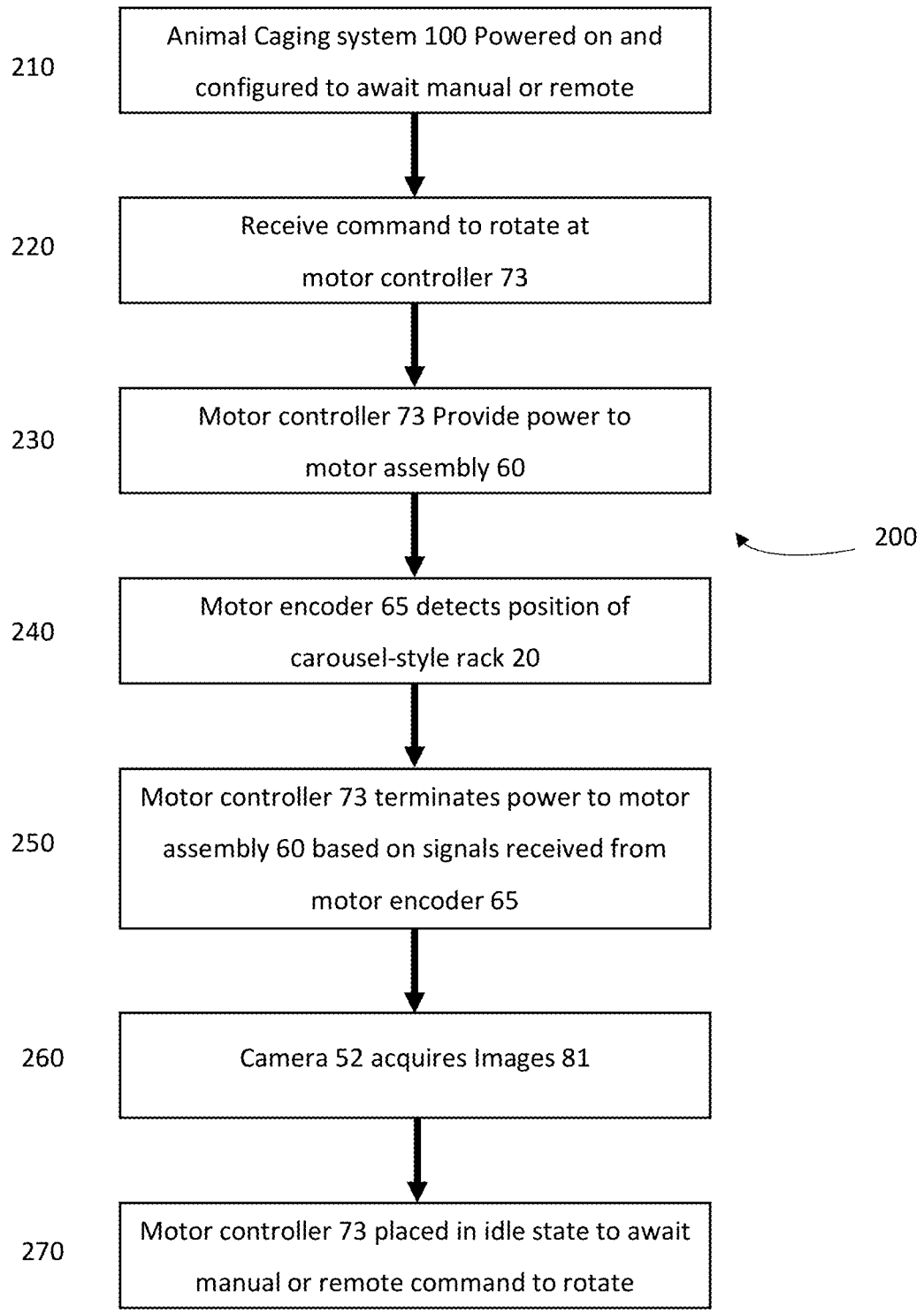
FIG. 14 is a flowchart of the usage.

Referring to FIG. 14, a method for rotating the carousel-style rack 200 according to the present disclosure is provided. In the step 210, animal caging system 100 is powered on and configured to await either a manual command or command from software interface 80 to begin taking images and/or rotate the carousel-style rack 20. The command from the software may be part of a pre-programmed schedule. For example, the schedule could be a regular program for monitoring each cage 22 on a platter 21 on an hourly or daily basis. The schedule may be customizable based on a number of criteria, including the time of day, the time spent monitoring a given cage 22 in a cycle, the amount of data and/or number of images that need to be captured during monitoring, or other factors. Additionally, the command from the software may be triggered by an external stimulus. In some embodiments, the software interface may detect, for example by interpreting data captured by the sensor 52, such as images captured by camera 52, that indicate that cage 22 is empty or has been removed from platter 21, triggering a command to rotate. In other embodiments, control interface 70 or software interface 80 may be capable of interpreting data on or associated with cage 22 that is within the field of sensor 52, such as written text or a bar code providing instructions to the software interface 80 to govern the rotation of the carousel-style rack 20.

In step 220, a command to rotate carousel-style rack 20 is received by motor controller 73. In step 230, motor controller 73 provides power to motor assembly 60 to rotate. In one embodiment, motor controller 73 gradually increases and decreases power to motor assembly 60 to provide gentle rotational acceleration to minimize any disturbance to the animals being monitored. In step 240, motor encoder 65 generates a feedback signal used to determine the position of carousel-style rack 20, in order to determine when the carousel-style rack 20 has rotated enough to position the next cage in sequence in front of each sensor 52. In step 250, motor controller 73 terminates power to motor assembly 60 upon receiving an indication that carousel-style rack 20 has completed rotation to the next cage 22. In step 260, sensor 52 acquires data, such as camera 52 acquiring images 81. In step 270, animal caging system 100 is placed in an idle state to await a next command to rotate the carousel-style rack 20. The rotation is locked until the next command is given.

Figure 15:
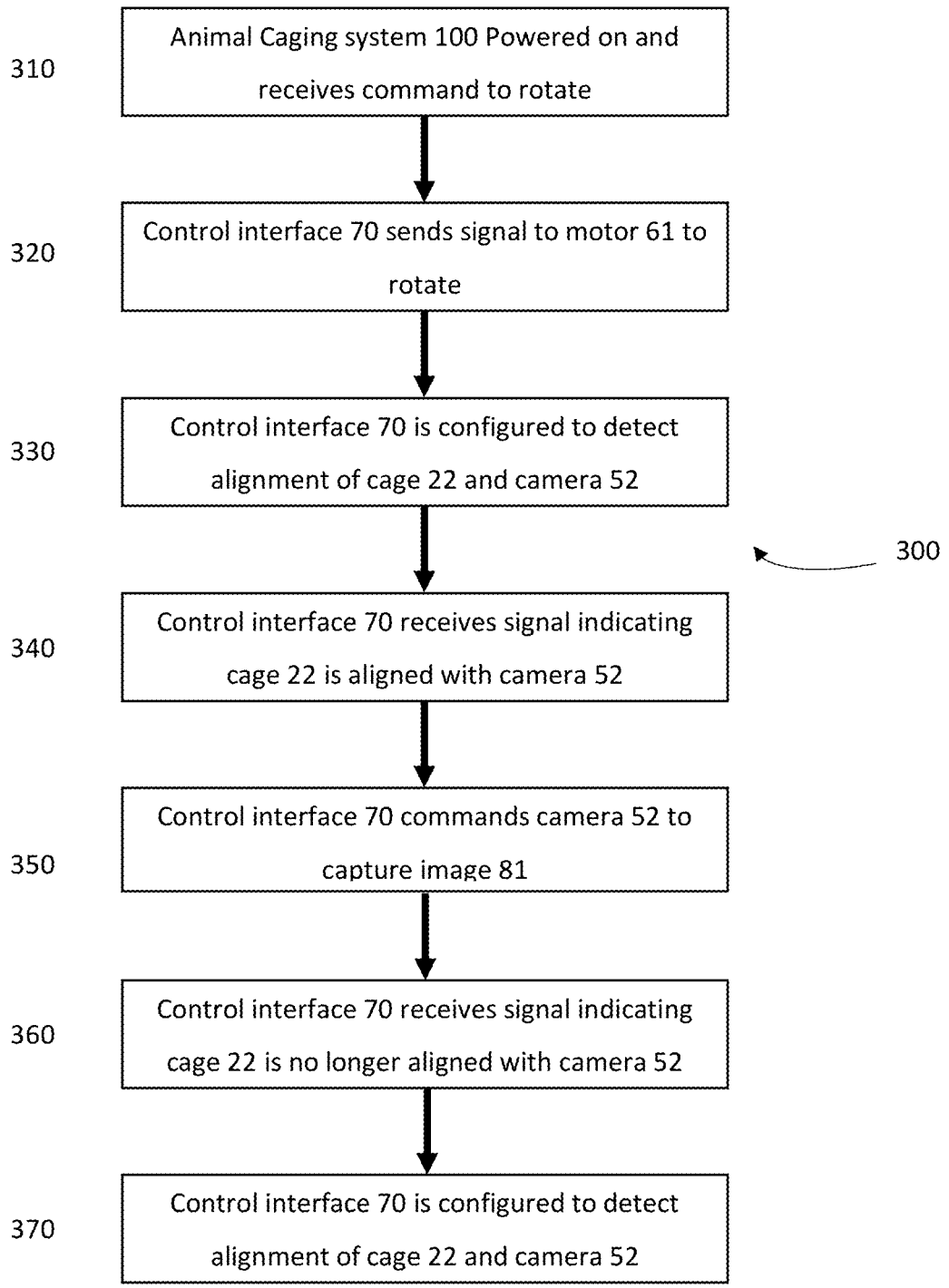
FIG. 15 is a flowchart of the usage.

Referring to FIG. 15, an alternate method for rotating the carousel style rack 300 is provided. In step 310, animal caging system 100 is powered on and receives a command at the control interface 70 to begin rotating the carousel-style rack 20. In step 320, the control interface 70 sends a signal to the motor assembly 60 to gradually increase the power delivered to the motor 61 until the motor assembly 60 achieves a pre-programmed rate of rotation. It is advantageous to gradually increase and decrease the power delivered to the motor 61 because slow changes in rotation speed will be less perceptible to the animals being monitored. In step 330 control interface 70 begins receiving signals from position sensor 63 indicating the position of cages 22 relative to sensors 52, and control interface 70 is configured to detect the next instance that cages 22 are aligned with sensors 52. In step 340, control interface 70 receives a signal that cages 22 are aligned with sensors 52. In step 350, control interface 70 commands sensor 52 to capture data, such as camera 52 to capture an image 81. In this embodiment, carousel-style rack 20 rotates continuously at a slow rate as images 81 are captured. In step 360, control interface 70 receives a signal from position sensor 63 indicating that cage 22 has passed out of alignment with sensor 52. In step 360 370 control interface 70 is again configured to detect the next instance that cages 22 are aligned with sensor 52.

In accordance with one aspect, there is provided a method of retrofitting an animal caging system. Any one or more component of the monitoring system disclosed herein may be advantageously fitted to an existing animal caging system, such as an animal caging system comprising a frame 10, a carousel-style rack 20 supported by the frame 10, a plurality of platters 21 supported by the carousel-style rack 20, and a plurality of animal cages 22 supported by the platters 21, as previously described.

The method of retrofitting an animal caging system may comprise providing any one or more component of a monitoring system, such as a support leg 50, sensor 52 mountable or attachable to support leg 50, and a mounting arm 55 for attaching support leg 50 to frame 10. The method may comprise providing instructions to attach the support leg 50 to the frame 10 via the mounting arm 55. In some embodiments, the method may comprise attaching the support leg 50 to the frame 10 via the mounting arm 55.

In some embodiments, the method may comprise providing a drive subsystem of monitoring system. The drive subsystem may have a quick mechanical disconnect and quick electrical disconnect from the monitoring system. The drive subsystem may comprise, for example, motor 60 and on-rack drive system 15. In some embodiments, for example where the animal caging system being retrofitted comprises motor 60, the method may comprise providing on-rack drive system 15. The methods may comprise providing instructions to operably connect motor 60 and/or on-rack drive system 15 to cage rack 20. In some embodiments, the method may comprise operably connecting motor 60 and/or on-rack drive system 15 to cage rack 20. The methods may comprise providing a mechanism to engage/disengage on-rack drive system 15 from motor 60.

In some embodiments, the method may comprise providing an electronics subsystem of monitoring system. The electronics subsystem may have a quick mechanical disconnect and quick electrical disconnect from the monitoring system. The electronics subsystem may comprise, for example, control interface 70, device hub 71, communication hub 72, motor controller 73, and/or a power supply 74.

The method may comprise operably connecting one or more component of the system to control interface 70 and/or software interface 80. For instance, the methods may comprise operably connecting sensor 52 to control interface 70 and/or software interface 80. The methods may comprise operably connecting motor 60 and/or on-rack drive system 15 to control interface 70 and/or software interface 80. In some embodiments, the methods may comprise operably connecting one or more component of the mechanism to engage/disengage on-rack drive system 15 from motor 60 to control interface 70 and/or software interface 80.

The method may comprise operably connecting control interface to software interface, for example, via communication hub 72. In some embodiments, the method may comprise programming software interface 80 to interpret data received by sensor 52. In some embodiments, the method may comprise programming software interface 80 or control interface 70 to operate the animal caging subsystem in accordance with the methods disclosed herein, for example, to rotate cage rack 20, engage/disengage on-track drive system 15, and/or initiate sensor 52.

Additional components may be provided, connected, installed, and/or programmed in accordance with the disclosure.

Example: Use of Software Interface to Control the Animal Caging System

The animal caging system described herein may be remotely controlled by a software interface. A user may utilize the software interface to perform a variety of tasks, such as programming a monitoring protocol to be executed by the monitoring system, reviewing data collected by the monitoring system, optionally data that has been interpreted by the software interface, and others. Below is a list of non-exhaustive exemplary ways a user may interact with the animal caging system via the software interface.

Program cage rack to automatically rotate on a schedule to capture data based on time and date inputs, duration of measurement/data capture (for example, video duration), and other features;

Program control interface to relay data capture (for example, video feed) to other data management software systems;

Program sensors to monitor vital signs of animals (for example, use thermal imaging to monitor temperature) over time in selected periodic intervals, optionally program software interface to record vital measurements in selected periodic intervals or responsive to a threshold value measured, optionally program software interface to notify a user of recorded vital measurements;

Program software interface to determine quantity of animals in animal cage by monitoring images in selected periodic intervals, optionally by producing three-dimensional images from a plurality of two-dimensional images;

Program software interface to determine activity level of animals in animal cage by monitoring images in selected periodic intervals, optionally by producing three-dimensional images from a plurality of two-dimensional images, optionally program software interface to notify a user of activity level;

Program software interface to determine health of animals in animal cages by monitoring vital signs and/or atmospheric gas parameters (for example, $CO_2$ concentration in animal cage or exhaust of animal cage) in selected periodic intervals, optionally program software interface to record vital measurements and/or atmospheric gas parameters in selected periodic intervals or responsive to a threshold value measured, optionally program software interface to notify a user of recorded vital measurements and/or atmospheric gas parameters;

Program software interface to determine environment status (for example, bedding status) of animals in animal cages by monitoring atmospheric gas parameters (for example, ammonia concentration in animal cage or exhaust of animal cage) in selected periodic intervals, optionally program software interface to record atmospheric gas parameters in selected periodic intervals or responsive to a threshold value measured, optionally program software interface to notify a user of recorded atmospheric gas parameters;

Program software interface to determine environment status (for example, water level and/or feed level status) of animals in animal cages by monitoring images or video feed in selected periodic intervals, optionally program software interface to notify a user of environment status responsive to a threshold value measured;

Program software interface to determine cage rack air change on selected periodic intervals by monitoring atmospheric gas parameters in animal cage or exhaust of animal cage;

Program software interface to locate a selected animal or animal cage on cage rack based on scan of identifying information (for example, NFC tag or barcode) from animal tags or animal cage labels, such as cage cards;

Use software interface to annotate data (for example, video records), optionally with integrations to local information management systems;

Program software interface to drive (for example, restrict) access control to software interface, data stored in a memory device associated with software interface, and/or control interface, based on local software integrations.

Accordingly, the software interface may enable a variety of uses for the animal caging system described herein. Furthermore, such programs may be highly customizable in accordance with the needs of the user and updated as those needs change and further features become available.

Having now described some illustrative embodiments, it is apparent that the foregoing is illustrative and not limiting, having been presented by way of example. In particular, although many of the examples presented herein involve specific combinations of elements, those elements may be combined in other combinations. Elements and features discussed only in connection with one embodiment are not intended to be excluded from other embodiments.

Any references to front and back, left and right, top and bottom, or upper and lower and the like are intended for convenience of description, not to limit the present systems and methods or their components to any one positional or spatial orientation.

Any references to embodiments or elements herein referred to in the singular may also embrace embodiments including a plurality of these elements, and any references in plural to any embodiment or element herein may also embrace embodiments including only a single element. References in the singular or plural form are not intended to limit the presently disclosed components or elements to single or plural configurations.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature or characteristic described in connection with the embodiment may be included in at least one embodiment. Such terms as used herein are not necessarily all referring to the same embodiment. Any embodiment may be combined with any other embodiment, inclusively or exclusively, in any manner consistent with the aspects and embodiments disclosed herein.

What is claimed is:

1. A monitoring system for use with an animal caging system comprising:
   a support leg;
   a mounting arm configured to attach the support leg to the animal caging system;
   a first sensor attached to the support leg,
   wherein the support leg is configured to be mounted to the animal caging system in a monitoring position, in which the first sensor is in a position to monitor the animal caging system; and
   a motor configured to removably engage with an on-rack drive system of the animal caging system and rotate a portion of the animal caging system relative to the first sensor,
   the motor being capable of being controlled to automatically disengage from the on-rack drive system when the portion of the animal caging system has stopped rotating.

2. The monitoring system of claim 1, wherein the first sensor is an optical sensor.

3. The monitoring system of claim 1, wherein the first sensor is a non-optical sensor.

4. The monitoring system of claim 1, wherein the support leg comprises a first sensor arm, and the first sensor is attached to the first sensor arm.

5. The monitoring system of claim 4, further comprising a second sensor arm attached to the support leg, and a second sensor attached to the second sensor arm.

6. The monitoring system of claim 1, wherein the first sensor is a camera configured to capture images in one or both of an infrared or visible spectrum of light.

7. The monitoring system of claim 1, further comprising a second sensor attached to the support leg.

8. The monitoring system of claim 1, wherein the first sensor is connectable to a control unit operating a software interface configured to receive data captured by the first sensor.

9. The monitoring system of claim 8, wherein the software interface is programmed to interpret the data captured by the first sensor to generate identifying information.

10. The monitoring system of claim 8, wherein the software interface is programmed to interpret the data captured by the first sensor to generate status information indicative of one or more of: an animal vital sign, an animal birth event, an animal death, an animal experiencing an elevated immune response, a low level of animal food, a low level of animal water, an animal cage flooding, or an animal cage dirty bedding.

11. The monitoring system of claim 1, further comprising a motor encoder configured to determine a position of the portion of the animal caging system relative to the first sensor.

12. The monitoring system of claim 1, wherein the motor comprises a spur gear configured to removably engage a corresponding spur gear of the on-rack drive system.

13. The monitoring system of claim 12, wherein the on-rack drive system further comprises a belt drive configured to be engaged with the spur gear of the on-rack drive system.

14. An animal caging system comprising:
    a frame;
    a cage rack supported by the frame;
    an animal cage supported by the cage rack;
    a monitoring system having a support leg, a mounting arm attached to the support leg and to the frame, and a sensor configured to be mounted on the support leg; and
    a motor configured to rotate the cage rack and a motor encoder configured to determine a position of the cage rack relative to the sensor.

15. The animal caging system of claim 14, wherein the support leg comprises a sensor arm, and the sensor is configured to be mounted on the sensor arm.

16. The animal caging system of claim 14, wherein the monitoring system is capable of being mounted to the animal caging system in a monitoring position in which the sensor is positioned relative to the animal cage.

17. The animal caging system of claim 14, wherein the monitoring system is capable of being rotated into a monitoring position in which the sensor is positioned in front or above the animal cage.

18. The animal caging system of claim 14, wherein the motor is capable of being controlled to automatically disengage from the cage rack when the cage rack has stopped rotating.

19. The animal caging system of claim 14, wherein the sensor is a camera configured to capture an image of an interior of the animal cage when the cage rack has stopped rotating.

20. The animal caging system of claim 14, wherein the sensor is configured to capture data encoding identifying information associated with the animal or animal cage.

21. The animal caging system of claim 14, wherein the sensor is a camera configured to capture an image of an interior of the animal cage once every rotation of the cage rack.

22. The animal caging system of claim 14, further comprising a plurality of cage racks supported by the frame and a plurality of animal cages on each cage rack, wherein the monitoring system includes a plurality of sensors mounted on the support leg, wherein at least one sensor is configured to capture an image of each of the plurality of animal cages on each of the plurality of cage racks once every rotation of each cage rack.

23. The animal caging system of claim 22, wherein the monitoring system includes a plurality of sensor arms attached to the support leg and at least one sensor mounted on each sensor arm.

24. The animal caging system of claim 22, wherein more than one sensor is configured to capture the image of each of the plurality of animal cages on each cage rack.

25. The animal caging system of claim 14, wherein the sensor is a camera configured to capture a video stream of the cage rack while static and when the cage rack is rotating.

26. The animal caging system of claim 14, wherein the sensor is a camera and the monitoring system is connectable to a software interface configured to receive images captured by the camera.

27. The animal caging system of claim 26, wherein the software interface is programmed to generate identifying information or status information from the images.

28. The animal caging system of claim 14, wherein the motor comprises a spur gear configured to engage a corresponding spur gear of an on-rack drive system of the cage rack.

29. The animal caging system of claim 28, wherein the motor encoder is configured to monitor at least one of the spur gear of the motor and the spur gear of the on-rack drive system.

30. A method of monitoring animal cages in the animal caging system of claim 14, the method comprising:
   rotating the cage rack to position the animal cage relative to the sensor; and
   capturing data from the animal cage via the sensor to be transmitted to a software interface programmed to interpret the data captured by the sensor.

31. The method of claim 30, wherein the sensor is a camera and the data includes images captured by the camera, the method further comprising:
   detecting via a control program that the camera is positioned above or in front of the animal cage; and
   storing via the software interface the images captured by the camera.

32. The method of claim 31, wherein the images captured by the camera include a series of two-dimensional images, the method further comprising:
   creating via the software interface a three-dimensional image of the animal cage based on the series of two-dimensional images captured by the camera.

33. A method of retrofitting an animal caging system comprising a frame, a cage rack supported by the frame, and an animal cage supported by the cage rack, the method comprising:
   providing a monitoring system having a support leg, a mounting arm attachable to the support leg and to the frame, a sensor configured to be mounted on the support leg, and a motor configured to removably engage with an on-rack drive system of the cage rack and rotate a portion of the animal caging system relative to the sensor, the motor being capable of being controlled to automatically engage or disengage from the on-rack drive system; and
   providing instructions to attach the support leg to the frame via the mounting arm.

34. The method of claim 33, further comprising providing instructions to operably connect the motor to the cage rack.

35. The method of claim 33, further comprising providing a control interface and operably connecting the control interface to the motor, the control interface configured to disengage the motor from the cage rack when the cage rack has stopped rotating.

36. The method of claim 33, further comprising providing access to a software interface connectable to the sensor and configured to receive data captured by the sensor.

37. The method of claim 36, wherein the software interface is programmed to interpret the data captured by the sensor.

* * * * *